US012665515B2

(12) United States Patent　　　　　(10) Patent No.:　US 12,665,515 B2
Chen　　　　　　　　　　　　　　　　　(45) Date of Patent:　Jun. 23, 2026

(54) POWER SUPPLY CONTROL SYSTEM FOR MULTI-PHASE POWER CONVERTER

(71) Applicant: ANPEC ELECTRONICS CORPORATION, Hsinchu (TW)

(72) Inventor: Chih-Ning Chen, Taipei City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 374 days.

(21) Appl. No.: 18/583,803

(22) Filed: Feb. 21, 2024

(65) Prior Publication Data

US 2025/0112557 A1　　Apr. 3, 2025

(30) Foreign Application Priority Data

Sep. 28, 2023　(TW) ................................. 112137243

(51) Int. Cl.
H02M 3/158　　　(2006.01)
H02M 3/157　　　(2006.01)

(52) U.S. Cl.
CPC ......... H02M 3/1586 (2021.05); H02M 3/157 (2013.01)

(58) Field of Classification Search
CPC .... H02M 1/00; H02M 1/0008; H02M 1/0003; H02M 3/1586; H02M 3/157; H02M 3/158
See application file for complete search history.

(56) References Cited

U.S. PATENT DOCUMENTS 7,239,257 B1 *　7/2007　Alexander ............ H02M 3/157
　　　　　　　　　　　　　　　　　　341/138
7,545,131 B1 *　6/2009　Alexander ............ H02M 3/156
　　　　　　　　　　　　　　　　　　323/275
(Continued)

FOREIGN PATENT DOCUMENTS

EP　　　　4203298 A1 *　6/2023　.............. H02P 11/06

OTHER PUBLICATIONS

Mortezaei, Ali, et al. "Cooperative control of multi-master-slave islanded microgrid with power quality enhancement based on conservative power theory." IEEE transactions on smart grid 9.4 (2016): 2964-2975. (Year: 2016).*

(Continued)

*Primary Examiner* — Thienvu V Tran
*Assistant Examiner* — Yahveh Comas Torres
(74) *Attorney, Agent, or Firm* — Li & Cai Intellectual Property Office

(57)　　　　　　ABSTRACT
A power supply control system for a multi-phase power converter is provided. The power supply control system classifies each of a plurality of power converters into one of a plurality of power groups. The power supply control system selects one of the plurality of power converters classified in each of the plurality of power groups as a master power converter, and selects others of the plurality of power converters in each of the plurality of power groups as slave power converters. The power supply control system, according to data of the master power converter, outputs an on-time controlling signal for controlling an on-time of a high-side switch and an on-time of a low-side switch of each of the plurality of power converters, so as to control the plurality of power converters for supplying appropriate power to electronic devices.

15 Claims, 18 Drawing Sheets

(56) References Cited

U.S. PATENT DOCUMENTS

| | | | | |
|---|---|---|---|---|
| 7,825,642 | B1* | 11/2010 | Young | H02M 3/157 |
| | | | | 323/283 |
| 8,120,203 | B2* | 2/2012 | Heineman | H02J 1/08 |
| | | | | 307/64 |
| 8,120,205 | B2* | 2/2012 | Heineman | H02J 1/08 |
| | | | | 307/58 |
| 8,237,423 | B2* | 8/2012 | Heineman | H02M 3/1584 |
| | | | | 323/283 |
| 8,487,477 | B2* | 7/2013 | Heineman | H02J 1/102 |
| | | | | 307/53 |
| 9,912,240 | B1* | 3/2018 | Nguyen | H02M 1/36 |
| 10,200,050 | B1* | 2/2019 | Ren | G05F 3/04 |
| 11,762,405 | B2* | 9/2023 | Morroni | G05F 1/56 |
| | | | | 323/271 |
| 2017/0237349 | A1* | 8/2017 | Labib | H02M 3/158 |
| | | | | 323/271 |
| 2018/0123454 | A1* | 5/2018 | Symonds | H02J 1/10 |
| 2021/0028704 | A1* | 1/2021 | Jiang | H02M 3/1584 |
| 2021/0349486 | A1* | 11/2021 | Morroni | G05F 1/56 |
| 2024/0088791 | A1* | 3/2024 | Hosotani | H02M 3/1584 |

OTHER PUBLICATIONS

Han, Hua, et al. "Review of power sharing control strategies for islanding operation of AC microgrids." IEEE Transactions on Smart Grid 7.1 (2015): 200-215. (Year: 2015).*

Machine translation EP-4203298-A1 (Year: 2023).*

* cited by examiner

PW1 PW2 PW3 PW4 PW5 PW6

GRP1 [ 1, 1, 1, 1, 1, 1 ]

GRP2 [ 0, 0, 0, 0, 0, 0 ]

GRP3 [ 0, 0, 0, 0, 0, 0 ]

SIG [ 0, 0, 0, 0, 0, 0 ]

MSR [ 1, 0, 0, 0, 0, 0 ]

FIG. 9

```
        PW1 PW2 PW3 PW4 PW5 PW6
GRP1 [ 1,  1,  0,  1,  0 ]
GRP2 [ 0,  0,  1,  0,  1 ]
GRP3 [ 0,  0,  0,  0,  0 ]
 SIG [ 0,  0,  0,  0,  0 ]
 MSR [ 1,  0,  1,  0,  0 ]
```

FIG. 11

```
        PW1 PW2 PW3 PW4 PW5 PW6
GRP1 [ 1, 0, 1, 0, 1, 0 ]
GRP2 [ 0, 1, 0, 1, 0, 1 ]
GRP3 [ 0, 0, 0, 0, 0, 0 ]
 SIG [ 0, 0, 0, 0, 0, 0 ]
 MSR [ 1, 1, 0, 0, 0, 0 ]
```

GRP1 [ 1, 0, 1, 0, 0, 0 ]

GRP2 [ 0, 0, 0, 0, 0, 0 ]

GRP3 [ 0, 0, 0, 0, 0, 0 ]

SIG [ 0, 1, 0, 1, 1, 1 ]

MSR [ 1, 0, 0, 0, 0, 0 ]

FIG. 15

POWER SUPPLY CONTROL SYSTEM FOR MULTI-PHASE POWER CONVERTER

CROSS-REFERENCE TO RELATED PATENT APPLICATION

This application claims the benefit of priority to Taiwan Patent Application No. 112137243, filed on Sep. 28, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power supply control system for a multi-phase power converter.

BACKGROUND OF THE DISCLOSURE

Power converters are indispensable for electronic devices. The power converters are used to adjust power and supply the adjusted power to the electronic devices. A high-side switch and a low side switch of the power converter must be switched according to voltages or currents of circuit components in the power converter such that the power converter supplies appropriate power to the electronic devices. However, a conventional power supply control system cannot effectively control multiple power converters to supply power at the same time. As a result, the electronic devices cannot effectively obtain the appropriate power from the multiple power converters.

SUMMARY OF THE DISCLOSURE

In response to the above-referenced technical inadequacies, the present disclosure provides a power supply control system for a multi-phase power converter. The multi-phase power converter includes a plurality of power converters. The power supply control system includes an error amplifying circuit, a comparing circuit, a phase selecting circuit, a multi-phase controlling circuit and an on-time determining circuit. The error amplifying circuit is connected to the plurality of power converters. The error amplifying circuit is configured to multiply a difference between an output voltage of each of the plurality of power converters and a first reference voltage by a gain to output an error amplified signal. The comparing circuit is connected to the error amplifying circuit. The comparing circuit is configured to compare a voltage of the error amplified signal of each of the plurality of power converters with a ramp signal to output a comparing signal. The phase selecting circuit is connected to the comparing circuit. The phase selecting circuit classifies each of the plurality of power converters into one of a plurality of power groups. The phase selecting circuit selects one of the plurality of power converters classified in each of the plurality of power groups as a master power converter, and selects others of the plurality of power converters classified in each of the plurality of power groups as a plurality of slave power converters. The phase selecting circuit outputs the comparing signal of the master power converter as a master phase signal and outputs the comparing signal of each of the plurality of slave power converters as a slave phase signal. The multi-phase controlling circuit is connected to the phase selecting circuit. The multi-phase controlling circuit is configured to output an on-time controlling signal according to the master phase signal of the master power converter from the phase selecting circuit. The on-time determining circuit is connected to the multi-phase controlling circuit and each of the plurality of power converters. The on-time determining circuit, according to the on-time controlling signal of the master power converter classified in each of the plurality of power groups, sets an on-time to output an on-time signal respectively to the power converters classified in each of the plurality of power groups for controlling an operation of the power converters.

In one of the possible or preferred embodiments, each of the plurality of power converters includes a high-side switch, a low-side switch, a driver circuit and a control circuit. A first terminal of the high-side switch is coupled to an input voltage. A first terminal of the low-side switch is connected to a second terminal of the high-side switch. A node between the first terminal of the low-side switch and the second terminal of the high-side switch is connected to a first terminal of an inductor. A second terminal of the inductor is connected to a first terminal of a capacitor. A second terminal of the capacitor is grounded. The driver circuit is connected to a control terminal of the high-side switch and a control terminal of the low-side switch. The control circuit is connected to the driver circuit and an output terminal of the on-time determining circuit. The control circuit is configured to control the driver circuit to drive the high-side switch and the low-side switch according to the on-time signal from the on-time determining circuit.

In one of the possible or preferred embodiments, the multi-phase controlling circuit obtains a plurality of master-slave codes respectively of the plurality of power converters from a lookup table. The multi-phase controlling circuit determines which one of the plurality of power converters to select according to the plurality of master-slave codes. The multi-phase controlling circuit uses the comparing signal of the power converter that is selected as the master phase signal.

In one of the possible or preferred embodiments, the master-slave code of one of the plurality of power converters is equal to a first master-slave code, and the multi-phase controlling circuit uses the comparing signal of the one of the plurality of power converter as the master phase signal. The master-slave code of every other one of the plurality of power converters is equal to a second master-slave code, and the multi-phase controlling circuit uses the comparing signal of every other one of the plurality of power converters as the slave phase signal.

In one of the possible or preferred embodiments, the multi-phase controlling circuit obtains a plurality of grouping codes respectively of the plurality of power converters that are classified in the plurality of power groups from a lookup table. The multi-phase controlling circuit determines which ones of the plurality of power converters are classified in a same one of the plurality of power groups, according to the plurality of grouping codes respectively of the plurality of power converters.

In one of the possible or preferred embodiments, the error amplifying circuit includes a plurality of error amplifiers. First input terminals of the plurality of error amplifiers are connected to output terminals of the plurality of power converters, respectively. A second input terminal of each of the plurality of error amplifiers is coupled to the first reference voltage. An output terminal of each of the plurality of error amplifiers is connected to an input terminal of the comparing circuit.

In one of the possible or preferred embodiments, the comparing circuit includes a plurality of comparators. First input terminals of the plurality of comparators are connected to the output terminals of the plurality of error amplifiers, respectively. A second input terminal of each of the plurality of comparators is connected to an external ramp signal generator, and receives the ramp signal from the external ramp signal generator. An output terminal of each of the plurality of comparators is connected to an input terminal of the phase selecting circuit.

In one of the possible or preferred embodiments, the phase selecting circuit includes a plurality of phase selectors. Input terminals of the plurality of phase selectors are connected to the output terminals of the plurality of comparators, respectively. An output terminal of each of the plurality of phase selectors is connected to an input terminal of the multi-phase controlling circuit. One of the plurality of phase selectors uses the comparing signal from one of the plurality of comparators as the master phase signal and outputs the master phase signal, according to a master-slave instructing signal. Every other one of the plurality of phase selectors uses the comparing signal from another one of the plurality of comparators as the slave phase signal and outputs the slave phase signal, according to the master-slave instructing signal.

In one of the possible or preferred embodiments, the on-time determining circuit includes a plurality of on-time generators. An input terminal of each of the plurality of on-time generators is connected to an output terminal of the multi-phase controlling circuit. Output terminals of the plurality of on-time generators are connected to input terminals of the plurality of power converters respectively.

In one of the possible or preferred embodiments, the phase selecting circuit includes a plurality of master-slave reference comparing circuits, a logic analyzing circuit and an on-time setting circuit. An input terminal of each of the plurality of master-slave reference comparing circuits is connected to an output terminal of the comparing circuit. The logic analyzing circuit is connected to an output terminal of each of the plurality of master-slave reference comparing circuits and an input terminal of the on-time setting circuit. An output terminal of the on-time setting circuit is used as an output terminal of the phase selecting circuit. The plurality of master-slave reference comparing circuits receives the plurality of comparing signals from the plurality of power converters respectively. The plurality of master-slave reference comparing circuits compare levels of the comparing signals with a master-slave code of the master power converter to output a plurality of master control reference comparing signals, respectively. The logic analyzing circuit controls the on-time setting circuit to output the on-time signal to each of the plurality of power converters, according to the plurality of master control reference comparing signals from the plurality of master-slave reference comparing circuits.

In one of the possible or preferred embodiments, each of the plurality of master-slave reference comparing circuits includes an AND gate. A first input terminal of the AND gate of each of the plurality of master-slave reference comparing circuits is connected to a lookup table module, and obtains a logic value of the master-slave code of the master power converter from the lookup table module. Second input terminals of the plurality of master-slave reference comparing circuits receive the comparing signals of the plurality of power converters from the comparing circuit, respectively. An output terminal of the AND gate of each of the plurality of master-slave reference comparing circuits is connected to an input terminal of the logic analyzing circuit.

In one of the possible or preferred embodiments, each of the plurality of master-slave reference comparing circuits includes a NAND gate and a NOT gate. A first input terminal of the NAND gate of each of the plurality of master-slave reference comparing circuits is connected to a lookup table module, and obtains a logic value of the master-slave code of the master power converter from the lookup table module. Second input terminals of the NAND gates of the plurality of master-slave reference comparing circuits receive the comparing signals of the plurality of power converters from the comparing circuit respectively. In each of the plurality of master-slave reference comparing circuits, an output terminal of the NAND gate is connected to an input terminal of the NOT gate. An output terminal of the NOT gate of each of the plurality of master-slave reference comparing circuits is connected to an input terminal of the logic analyzing circuit.

In one of the possible or preferred embodiments, the phase selecting circuit further includes a plurality of grouping comparing circuits. The grouping comparing circuits are connected to the logic analyzing circuit. The plurality of power converters are classified in the plurality of power groups. The plurality of grouping comparing circuits are connected to a lookup table module, and obtain a plurality of grouping codes respectively of the plurality of power converters from a plurality of power group messages stored in the lookup table module. Each of the plurality of grouping comparing circuits compares the grouping codes of two of the plurality of power converters with each other to output a grouping comparing signal. The logic analyzing circuit determines whether the two of the plurality of power converters are classified in a same one of the plurality of power groups according to the grouping comparing signal from each of the plurality of grouping comparing circuits, and accordingly controls the on-time setting circuit to output the on-time signal to each of the plurality of power converters.

In one of the possible or preferred embodiments, each of the plurality of grouping comparing circuits includes an AND gate. A first input terminal and a second input terminal of the AND gate of each of the plurality of grouping comparing circuits respectively receive logic values of the grouping codes of two of the plurality of power converters from each of the plurality of power group messages stored in a lookup table module. An output terminal of the AND gate of each of the plurality of grouping comparing circuits is connected to an input terminal of the logic analyzing circuit.

In one of the possible or preferred embodiments, each of the plurality of grouping comparing circuits includes a NAND gate and an NOT gate. A first input terminal and a second input terminal of the NAND gate of each of the plurality of grouping comparing circuits respectively receive logic values of the grouping codes of two of the plurality of power converters from each of the plurality of power group messages stored in a lookup table module. An output terminal of the NAND gate is connected to an input terminals of the NOT gate in each of the plurality of grouping comparing circuits. An output terminal of the NOT gate of each of the plurality of grouping comparing circuits is connected to an input terminal of the logic analyzing circuit.

As described above, the present disclosure provides the power supply control system for the multi-phase power converter. The power supply control system of the present disclosure classifies the plurality of power converters into the plurality of power groups, and individually controls each of the plurality of power groups to supply power. This power supply control performed on different ones of the plurality of power groups by the power supply control system of the present disclosure do not interfere with each other. The power supply control system of the present disclosure selects one of the plurality of power converters classified in each of the plurality of power groups as the master power converter, and selects others of the plurality of power converters classified in each of the plurality of power groups as the slave power converters. The power supply control system of the present disclosure, according to data of the master power converter of each of the plurality of power groups, controls the operations of the master power converter and the slave power converters of each of the plurality of power groups. As a result, the power converters classified in the same one of the plurality of power groups respectively supply the output voltages being equal to each other, and respectively supply the outputs currents being equal to each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 9 is a schematic diagram of a plurality of grouping codes and a plurality of master-slave codes of a power supply control system for a multi-phase power converter according to an eighth embodiment of the present disclosure;

FIG. 11 is a schematic diagram of a plurality of grouping codes and a plurality of master-slave codes of a power supply control system for a multi-phase power converter according to a ninth embodiment of the present disclosure;

FIG. 13 is a schematic diagram of a plurality of grouping codes and a plurality of master-slave codes of a power supply control system for a multi-phase power converter according to a tenth embodiment of the present disclosure;

FIG. 15 is a schematic diagram of a plurality of grouping codes and a plurality of master-slave codes of a power supply control system for a multi-phase power converter according to an eleventh embodiment of the present disclosure;

DETAILED DESCRIPTION OF THE EXEMPLARY EMBODIMENTS

Figure 1:
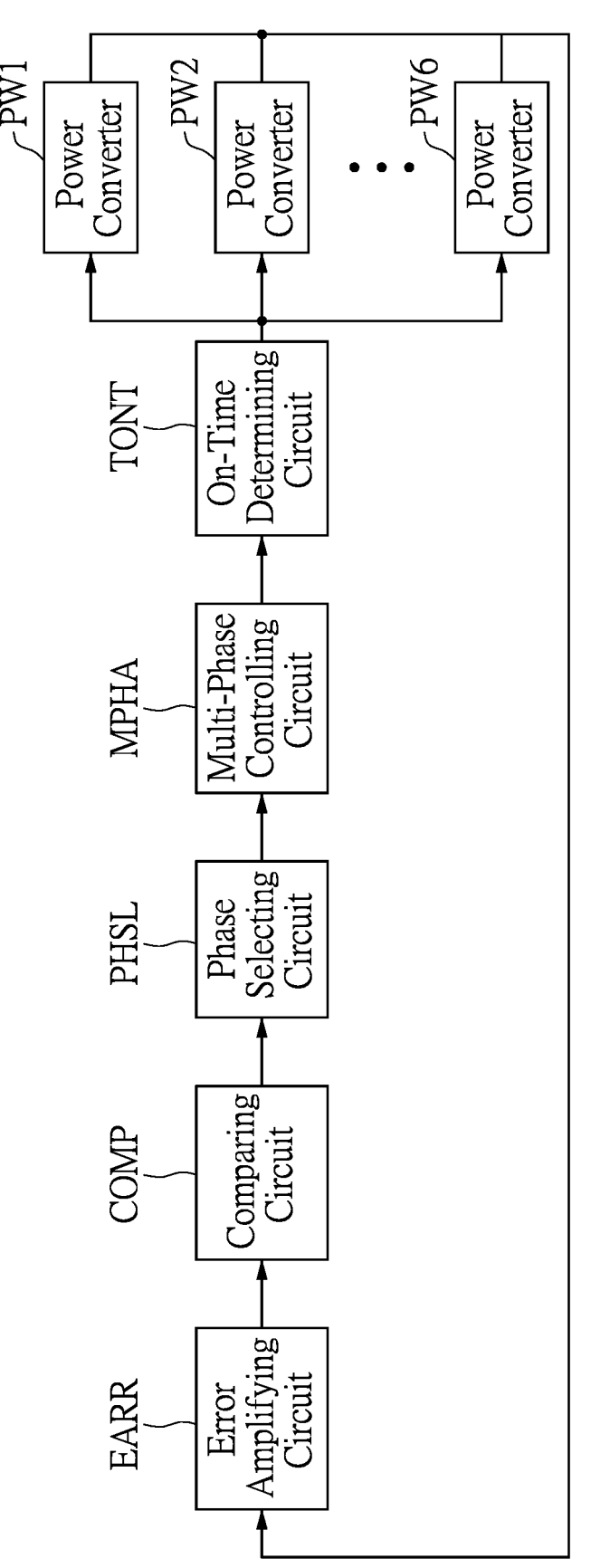
FIG. 1 is a block diagram of a power supply control system for a multi-phase power converter according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a power supply control system for a multi-phase power converter according to a first embodiment of the present disclosure.

The power supply control system of the first embodiment of the present disclosure is applicable to a plurality of power converters such as, but not limited to a plurality of power converters PW1 to PW6 as shown in FIG. 1. In practice, the power supply control system of the present disclosure may be applied to fewer or more power converters.

As shown in FIG. 1, in the first embodiment, the power supply control system of the present disclosure includes an error amplifying circuit EARR, a comparing circuit COMP, a phase selecting circuit PHSL, a multi-phase controlling circuit MPHA and an on-time determining circuit TONT.

An output terminal of each of the plurality of power converters PW1 to PW6 is connected to an input terminal of the error amplifying circuit EARR and a power receiving terminal of an external electronic device. The error amplifying circuit EARR multiplies a difference between an output voltage of each of the plurality of power converters PW1 to PW6 and a reference voltage by a gain to output an error amplified signal.

An output terminal of the error amplifying circuit EARR is connected to an input terminal of the comparing circuit COMP. The comparing circuit COMP compares a voltage of the error amplified signal of each of the plurality of power converters PW1 to PW6 from the error amplifying circuit EARR with a voltage of a ramp signal to output a comparing signal.

An output terminal of the comparing circuit COMP is connected to an input terminal of the phase selecting circuit PHSL.

It is worth noting that, the phase selecting circuit PHSL selects one of the plurality of comparing signals respectively of the plurality of power converters PW1 to PW6 from the comparing circuit COMP as a master phase signal, and selects others of the plurality of comparing signals respectively of the plurality of power converters PW1 to PW6 as a plurality of slave phase signals. The phase selecting circuit PHSL outputs the master phase signal and the plurality of slave phase signals.

An output terminal of the phase selecting circuit PHSL is connected to an input terminal of the multi-phase controlling circuit MPHA. The multi-phase controlling circuit MPHA outputs an on-time controlling signal according to the master phase signal from the phase selecting circuit PHSL.

An output terminal of the multi-phase controlling circuit MPHA is connected to an input terminal of the on-time determining circuit TONT. The on-time determining circuit TONT sets an on-time to output an on-time signal to each of the plurality of power converters PW1 to PW6 according to the on-time controlling signal from the multi-phase controlling circuit MPHA.

An output terminal of the on-time determining circuit TONT of the power supply control system of the first embodiment of the present disclosure is connected to an input terminal of each of the plurality of power converters PW1 to PW6. Each of the plurality of power converters PW1 to PW6 operates according to the on-time signal from the on-time determining circuit TONT. As a result, the plurality of power converters PW1 to PW6 operate as desired such that output voltages or output currents of the plurality of power converters PW1 to PW6 are effectively controlled to be equal to or approximately equal to each other.

Figure 2:
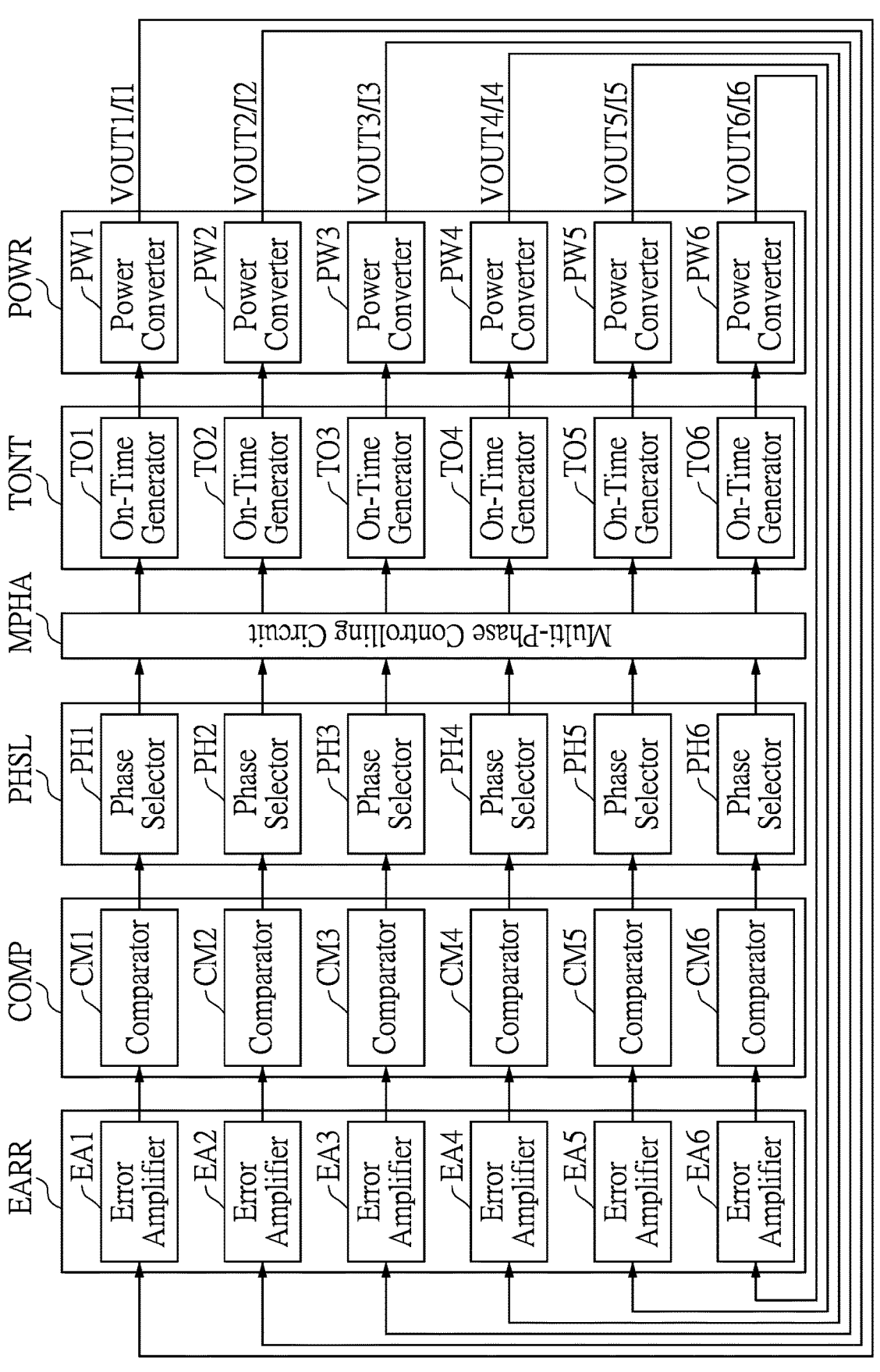
FIG. 2 is a block diagram of a power supply control system for a multi-phase power converter according to a second embodiment of the present disclosure.
Figure 3:
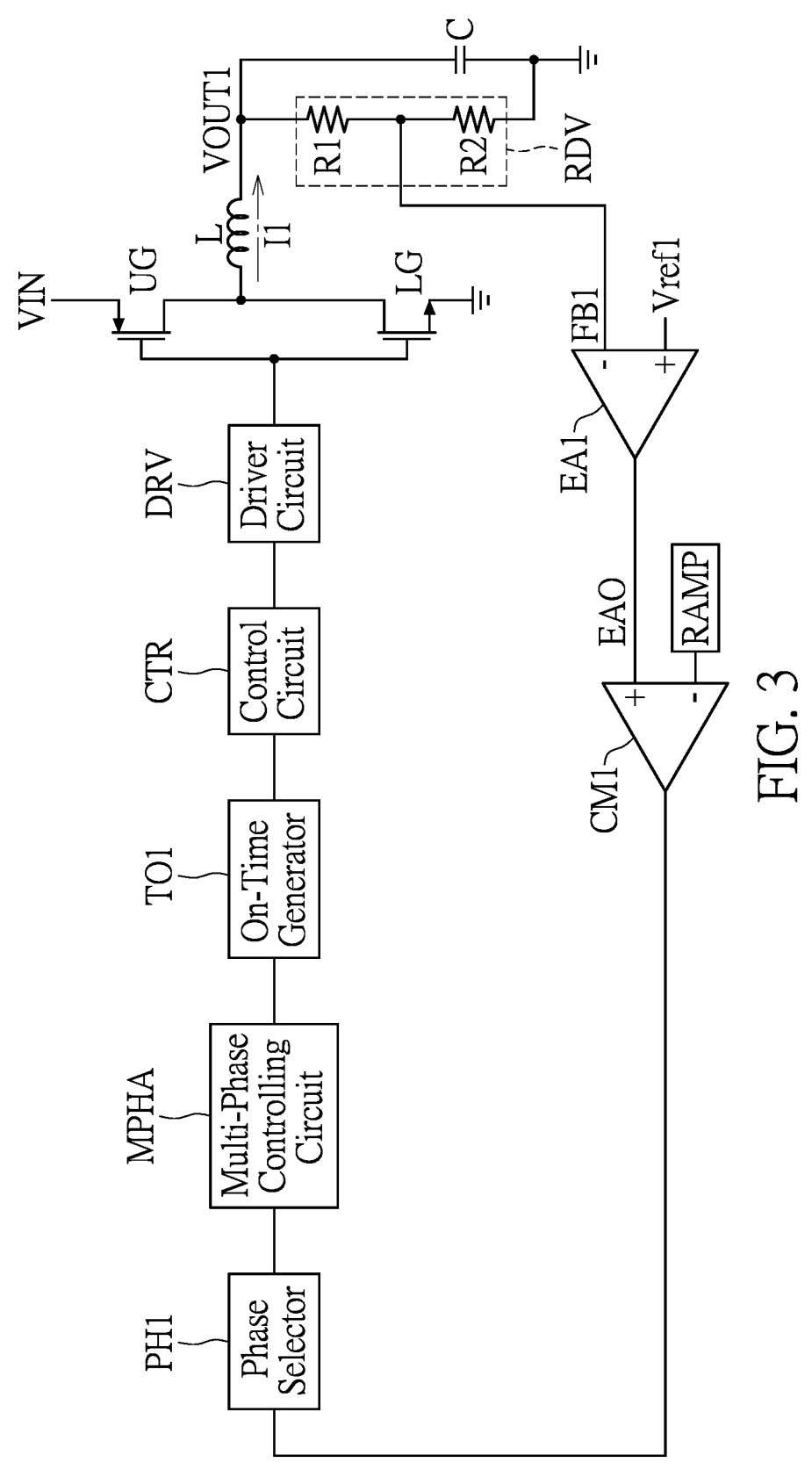
FIG. 3 is a block diagram of the power supply control system and a power converter controlled by the power supply control system according to the second embodiment of the present disclosure.

Reference is made to FIG. 2 and FIG. 3, in which FIG. 2 is a block diagram of a power supply control system for a multi-phase power converter according to a second embodiment of the present disclosure, and FIG. 3 is a block diagram of the power supply control system and a power converter controlled by the power supply control system according to the second embodiment of the present disclosure.

As shown in FIG. 2, in the second embodiment, the power supply control system of the present disclosure includes the error amplifying circuit EARR, the comparing circuit COMP, the phase selecting circuit PHSL, the multi-phase controlling circuit MPHA and the on-time determining circuit TONT.

The power supply control system of the second embodiment of the present disclosure is applicable to a plurality of power converters such as, but not limited to a plurality of power converters PW1 to PW6 as shown in FIG. 2. In practice, the power supply control system of the present disclosure may be applied to fewer or more power converters.

In the second embodiment, the error amplifying circuit EARR of the power supply control system of the present disclosure includes a plurality of error amplifiers such as, but not limited to a plurality of error amplifiers EA1 to EA6 as shown in FIG. 2. First input terminal of the plurality of error amplifiers EA1 to EA6 are connected to the output terminals of the plurality of power converters PW1 to PW6 respectively. The first input terminal of the plurality of error amplifiers EA1 to EA6 receive output voltages VOUT1 to VOUT6 of the plurality of power converters PW1 to PW6 or divided voltages of the output voltages VOUT1 to VOUT6, respectively. A second input terminal of each of the plurality of error amplifiers EA1 to EA6 is coupled to a first reference voltage Vref1.

Configurations of circuit components inside the plurality of power converters PW1 to PW6 may be the same as each other. For example, as shown in FIG. 3, the power converter PW1 includes a high-side switch UG, a low-side switch LG, a control circuit CTR and a driver circuit DRV. A first terminal of the high-side switch UG is coupled to an input voltage VIN. A first terminal of the low-side switch LG is connected to a second terminal of the high-side switch UG. A node between the first terminal of the low-side switch LG and the second terminal of the high-side switch UG is connected to a first terminal of an inductor L. A second terminal of the inductor L is connected to a first terminal of a capacitor C. A second terminal of the capacitor C is grounded.

If necessary, the power converter PW1 may further include a voltage divider circuit RDV as shown in FIG. 3. The voltage divider circuit RDV includes a first resistor R1 and a second resistor R2. A note between the second terminal of the inductor L and the first terminal of the capacitor C is connected to a first terminal of the first resistor R1. A second terminal of the first resistor R1 is connected to a first terminal of the second resistor R2. A second terminal of the second resistor R2 is grounded.

As shown in FIG. 3, a first input terminal such as an inverting input terminal of the error amplifier EA1 is connected to a node between the second terminal of the first resistor R1 and the first terminal of the second resistor R2.

The first input terminal such as the inverting input terminal of the error amplifier EA1 receives the divided voltage of the output voltage VOUT1 of the power converter PW1 as a feedback voltage FB1. A second input terminal such as a non-inverting input terminal of the error amplifier EA1 is coupled to the first reference voltage Vref1.

In practice, the first input terminal such as the inverting input terminal of the error amplifier EA1 may be directly connected to the node between the second terminal of the inductor L and the first terminal of the capacitor C (that is the output terminal of the power converter PW1). Under this condition, the first input terminal such as the inverting input terminal of the error amplifier EA1 directly receives the output voltage VOUT1 of the power converter PW1 as the feedback voltage FB1.

As shown in FIG. 2, the comparing circuit COMP includes a plurality of comparators CM1 to CM6. First input terminals of the plurality of comparators CM1 to CM6 are connected to output terminals of the plurality of error amplifiers EA1 to EA6 respectively. A second input terminal of each of the plurality of comparators CM1 to CM6 is connected to an external ramp signal generator and receives a ramp signal from the external ramp signal generator. For example, as shown in FIG. 3, The output terminal of the error amplifier EA1 is connected to the first input terminal such as a non-inverting input terminal of the comparator CM1, and outputs an error amplified signal EAO to the first input terminal of the comparator CM1. The second input terminal such as an inverting input terminal of the comparator CM1 receives a ramp signal RAMP.

The phase selecting circuit PHSL includes a plurality of phase selectors such as, but not limited to a plurality of phase selectors PH1 to PH6 as shown in FIG. 2. Input terminals of the plurality of phase selectors PH1 to PH6 are connected to output terminals of the plurality of comparators CM1 to CM6 respectively. An output terminal of each of the plurality of phase selectors PH1 to PH6 is connected to the input terminal of the multi-phase controlling circuit MPHA.

The input terminals of the plurality of phase selectors PH1 to PH6 receive the plurality of comparing signals from the plurality of comparators CM1 to CM6 respectively. One of the plurality of phase selectors PH1 to PH6 uses the received comparing signal as the master phase signal and outputs the master phase signal to the multi-phase controlling circuit MPHA (according to a master-slave instructing signal from an external circuit). Every other one of the plurality of phase selectors PH1 to PH6 uses the received comparing signal as the slave phase signal and outputs the slave phase signal to the multi-phase controlling circuit MPHA (according to the master-slave instructing signal from the external circuit).

The multi-phase controlling circuit MPHA outputs a plurality of on-time controlling signals respectively to a plurality of on-time generators TO1 to TO6 according to the master phase signal from the phase selecting circuit PHSL.

An input terminal of each of the plurality of on-time generators TO1 to TO6 is connected to the output terminal of the multi-phase controlling circuit MPHA. The plurality of on-time generators TO1 to TO6 set a plurality of on-times to output a plurality of on-time signal according to the plurality of on-time controlling signals from the multi-phase controlling circuit MPHA, respectively.

The plurality of control circuits CTR of the plurality of power converters PW1 to PW6 are connected to output terminals of the plurality of on-time generators TO1 to TO6 respectively. In each of the plurality of power converters PW1 to PW6, the control circuit CTR determines an on-time of the high-side switch UG and an on-time of the low-side switch LG according to the received on-time signal, and accordingly controls the driver circuit DRV to drive operations of the high-side switch UG and the low-side switch LG. As a result, the plurality of power converters PW1 to PW6 supply appropriate power, for example, respectively supply the output voltages VOUT1 to VOUT6 being equal to each other or output currents I1 to I6 being equal to each other.

Figure 4:
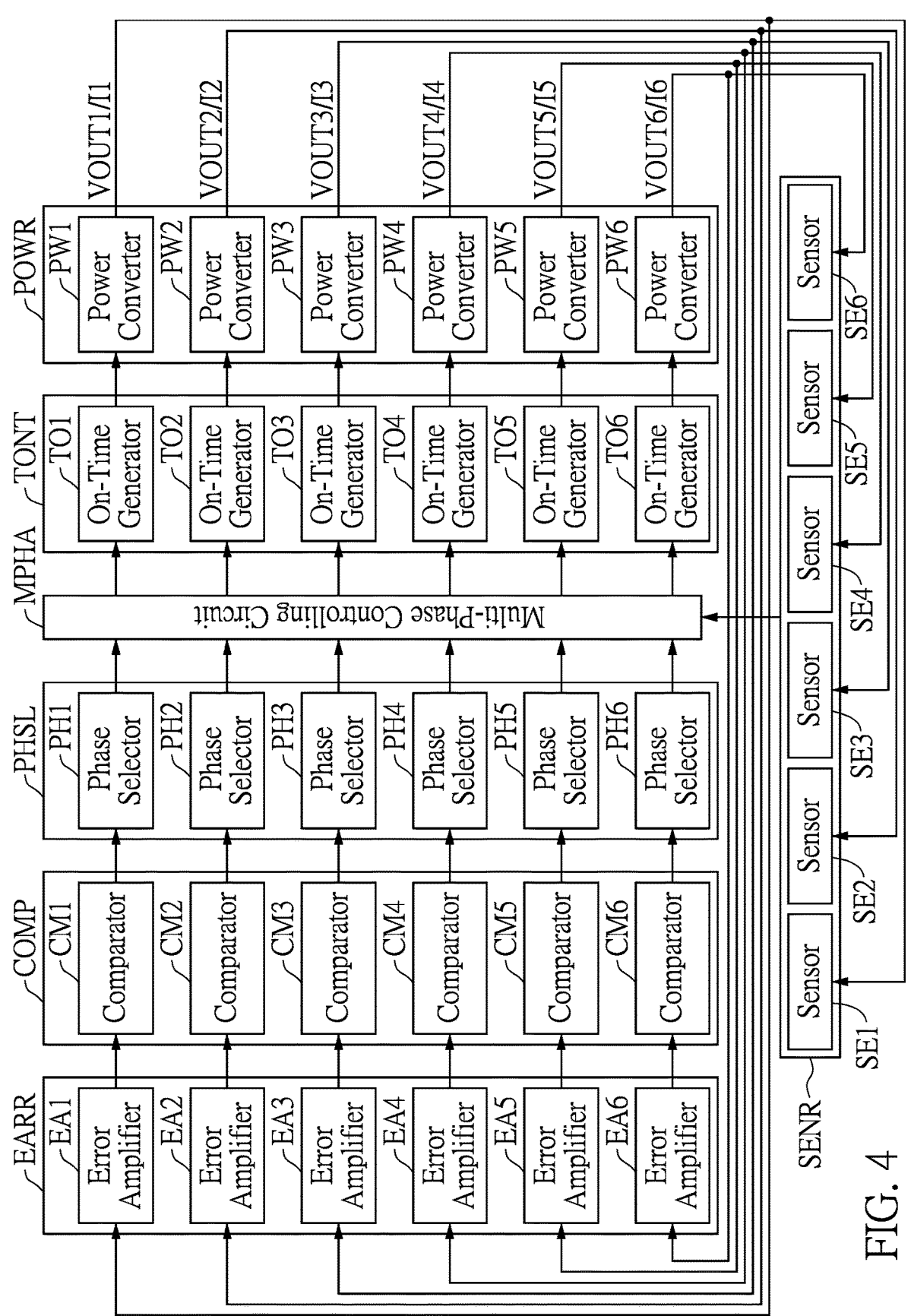
FIG. 4 is a block diagram of a power supply control system for a multi-phase power converter according to a third embodiment of the present disclosure.

Reference is made to FIG. 4, which is a block diagram of a power supply control system for a multi-phase power converter according to a third embodiment of the present disclosure.

The descriptions of the third embodiment of the present disclosure that are the same as the descriptions of the second embodiment of the present disclosure are not repeated herein.

A difference between the third and second embodiments of the present disclosure is that, the power supply control system of the third embodiment of the present disclosure further includes a sensor circuit SENR. In the third embodiment, the sensor circuit SENR may include a plurality of sensors such as, but not limited to a plurality of sensors SE1 to SE6 as shown in FIG. 4.

The plurality of sensors SE1 to SE6 are connected to the plurality of power converters PW1 to PW6 respectively. The plurality of sensors SE1 to SE6 sense the output currents I1 to I6 of the plurality of power converters PW1 to PW6 respectively. The plurality of sensors SE1 to SE6 respectively output the sensed output currents I1 to I6 of the plurality of power converters PW1 to PW6 (or convert the sensed output currents I1 to I6 into sensed voltages and output the sensed voltages) to the multi-phase controlling circuit MPHA as shown in FIG. 4 (or to another multi-phase controlling circuit).

The multi-phase controlling circuit MPHA (or the another multi-phase controlling circuit) may, according to (the sensed voltages converted from) the output currents of the plurality of power converters PW1 to PW6 from the sensor circuit SENR, control the plurality of on-time generators TO1 to TO6 to output the plurality of on-time signals to the plurality of power converters PW1 to PW6 for controlling power supply of the plurality of power converters PW1 to PW6, respectively.

Figure 5:
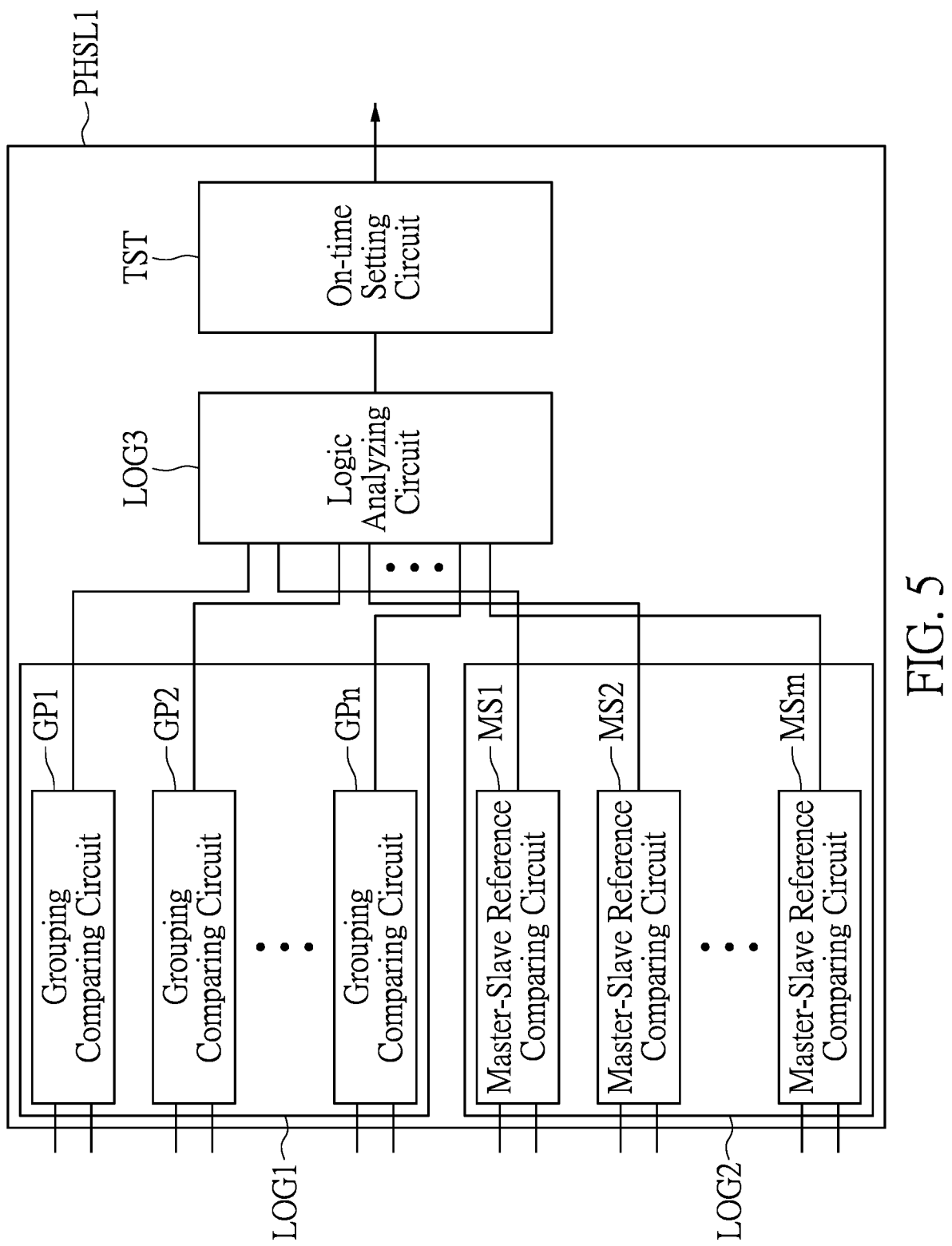
FIG. 5 is a block diagram of a phase selecting circuit of a power supply control system for a multi-phase power converter according to a fourth embodiment of the present disclosure.

Reference is made to FIG. 5, which is a block diagram of a phase selecting circuit of a power supply control system for a multi-phase power converter according to a fourth embodiment of the present disclosure.

In the fourth to sixth embodiments and the ninth to eleventh embodiments, the power supply control system of the present disclosure classifies the plurality of power converters such as the plurality of power converters PW1 to PW6 as shown in FIG. 1 into a plurality of power groups. If Some of the plurality of power converters PW1 to PW6 are classified in different ones of the plurality of power groups, and thus supply power to different ones of a plurality of external electronic devices respectively. Some of the plurality of power converters PW1 to PW6 are classified in a same one of the plurality of power groups and thus supply power to a same one of the plurality of external electronic devices.

For example, the phase selecting circuit PHSL as shown in FIG. 1 may be replaced with a phase selecting circuit PHSL1 as shown in FIG. 5.

As shown in FIG. 5, the phase selecting circuit PHSL1 may include a first circuit LOG1, a second circuit LOG2, a logic analyzing circuit LOG3 and an on-time setting circuit TST. The first circuit LOG1 includes a plurality of grouping comparing circuits GP1 to GPn. The second circuit LOG2 includes a plurality of master-slave reference comparing circuits MS1 to MSm.

The logic analyzing circuit LOG3 is connected to an output terminal of each of the plurality of grouping comparing circuits GP1 to GPn, an output terminal of each of the plurality of master-slave reference comparing circuits MS1 to MSm, and an input terminal of the on-time setting circuit TST. An output terminal of the on-time setting circuit TST is used as an output terminal of the phase selecting circuit PHSL1.

It is worth noting that, the plurality of grouping comparing circuits GP1 to GPn included in the first circuit LOG1 of the phase selecting circuit PHSL1 are configured to determine which ones of the plurality of power converters PW1 to PW6 are classified in the same one of the plurality of power groups, which are described in detail as follows.

The plurality of grouping comparing circuits GP1 to GPn obtain a plurality of grouping codes respectively of the plurality of power converters PW1 to PW6 from each of a plurality of power group messages on a lookup table (stored in a lookup table module connected to the plurality of grouping comparing circuits GP1 to GPn).

The plurality of grouping comparing circuits GP1 to GPn compare each two of the plurality of grouping codes respectively of the plurality of power converters PW1 to PW6 in each of the plurality of power group messages with each other. In detail, each of the plurality of grouping comparing circuits GP1 to GPn compares two of the plurality of grouping codes respectively of the plurality of power converters PW1 to PW6 from each of the plurality of power group messages with each other to output a grouping comparing signal.

The logic analyzing circuit LOG3 determines which ones of the plurality of power converters PW1 to PW6 are classified in the same one of the plurality of power groups according to the plurality of grouping comparing signals from the plurality of grouping comparing circuits GP1 to GPn.

It is worth noting that, the power supply control system of the fourth embodiment of the present disclosure selects one of the plurality of power converters PW1 to PW6 as a master power converter, and selects others of the plurality of power converters PW1 to PW6 as slave power converters. The power supply control system of the fourth embodiment of the present disclosure controls the slave power converters according to data related to the master power converter (such as the comparing signal used as the master phase signal). Therefore, in the fourth embodiment, the power supply control system of the present disclosure includes the plurality of master-slave reference comparing circuits MS1 to MSm of the second circuit LOG2.

Input terminals of the plurality of master-slave reference comparing circuits MS1 to MSm are connected to the output terminal of the comparing circuit COMP as shown in FIG. 1, or are connected to the output terminals of the plurality of comparators CM1 to CM6 of the comparing circuit COMP as shown in FIG. 4 respectively.

The plurality of master-slave reference comparing circuits MS1 to MSm receive the plurality of comparing signals of the plurality of power converters PW1 to PW6 from the comparing circuit COMP respectively. Each of the plurality of master-slave reference comparing circuits MS1 to MSm compares a level of the comparing signal from the comparing circuit COMP with (a logic value or a voltage level of)

the master-slave code of the master power converter (from the lookup table) to output a master control reference comparing signal.

The logic analyzing circuit LOG3 outputs a logic analyzed signal according to the plurality of grouping comparing signals from the plurality of grouping comparing circuits GP1 to GPn and the plurality of master control reference comparing signals from the plurality of master-slave reference comparing circuits MS1 to MSm.

The on-time setting circuit TST outputs the plurality of on-time signals respectively to the plurality of power converters PW1 to PW6 according to the logic analyzed signal from the logic analyzing circuit LOG3 for controlling the plurality of power converters PW1 to PW6 respectively to supply the output voltages VOUT1 to VOUT6 (that are equal to each other) or respectively to supply the output currents I1 to I6 (that are equal to each other).

Figure 6:
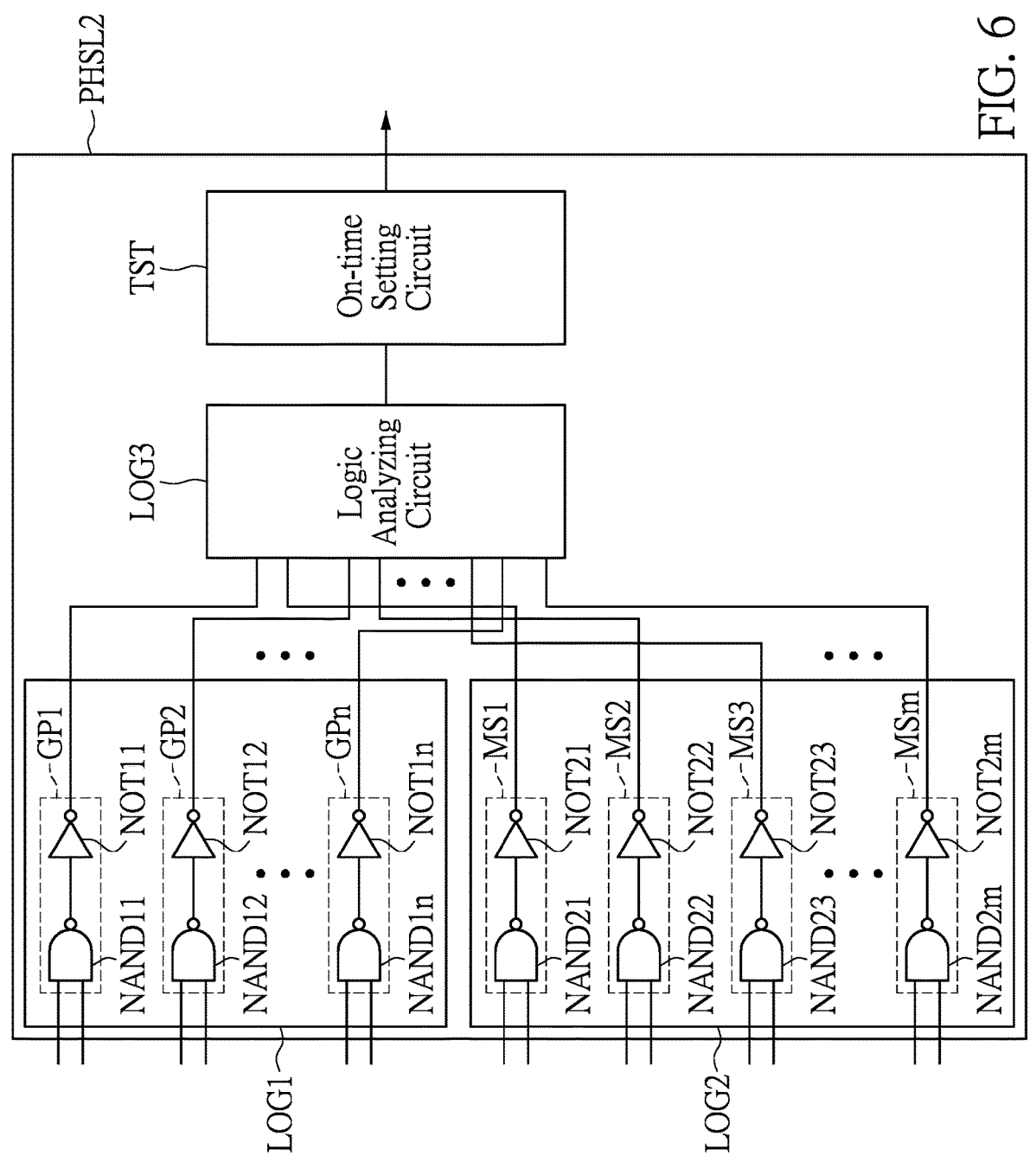
FIG. 6 is a block diagram of a phase selecting circuit of a power supply control system for a multi-phase power converter according to a fifth embodiment of the present disclosure.

Reference is made to FIG. 6, which is a block diagram of a phase selecting circuit of a power supply control system for a multi-phase power converter according to a fifth embodiment of the present disclosure.

The descriptions of the fifth embodiment of the present disclosure that are the same as the descriptions of the fourth embodiment of the present disclosure are not repeated herein.

The phase selecting circuit PHSL as shown in FIG. 1 may be replaced with a phase selecting circuit PHSL2 as shown in FIG. 6.

For example, as shown in FIG. 6, the plurality of grouping comparing circuits GP1 to GPn include a plurality of NAND gates NAND11 to NAND1$n$ respectively, and further include a plurality of NOT gates NOT11 to NOT1$n$ respectively.

A first input terminal and a second input terminal of each of the plurality of NAND gates NAND11 to NAND1$n$ are connected to the lookup table module, and respectively obtain logic values of grouping codes of two of the plurality of power converters PW1 to PW6 from a same one of the plurality of power group messages stored in the lookup table module.

For example, if the logic value of the grouping code of any one of the plurality of power converters PW1 to PW6 in the power group message of one of the plurality of power groups is equal to a logic value of a first grouping code (such as, but not limited to a logic value "0"), the one of the plurality of power converters PW1 to PW6 is not classified in the one of the plurality of power groups.

Conversely, if the logic value of the grouping code of any one of the plurality of power converters PW1 to PW6 in the power group message of one of the plurality of power groups is equal to a logic value of a second grouping code (such as, but not limited to a logic value "1"), the one of the plurality of power converters PW1 to PW6 is classified in the one of the plurality of power groups.

Output terminals of the plurality of NAND gates NAND11 to NAND In are connected to input terminals of the plurality of NOT gates NOT11 to NOT1$n$ respectively. An output terminal of each of the plurality of NOT gates NOT11 to NOT1$n$ is connected to an input terminal of the logic analyzing circuit LOG3.

For example, as shown in FIG. 6, the plurality of master-slave reference comparing circuits MS1 to MSm include a plurality of NAND gates NAND21 to NAND2$m$ respectively, and further include a plurality of NOT gates NOT21 to NOT2$m$ respectively.

A first input terminal of each of the plurality of NAND gates NAND21 to NAND2$m$ is connected to the lookup table module, and obtains the logic value of the master-slave code of the master power converter that is one of the plurality of power converters PW1 to PW6 from the lookup table module.

For example, the logic value of the master-slave code of the master power converter that is one of the plurality of power converters PW1 to PW6 is equal to a logic value of a first master-slave code (such as, but not limited to a logic value "1"), and the logic value of the master-slave code of each of the plurality of slave power converters that are others of the plurality of power converters PW1 to PW6 is equal to a logic value of a second master-slave code (such as, but not limited to a logic value "0").

Second input terminals of the plurality of NAND gates NAND21 to NAND2$m$ receive the plurality of comparing signals of the plurality of power converters PW1 to PW6 from the comparing circuit COMP respectively.

Output terminals of the plurality of NAND gates NAND21 to NAND2$m$ are connected to input terminals of the plurality of NOT gates NOT21 to NOT2$m$ respectively. An output terminal of each of the plurality of NOT gates NOT21 to NOT2$m$ is connected to the input terminal of the logic analyzing circuit LOG3.

Figure 7:
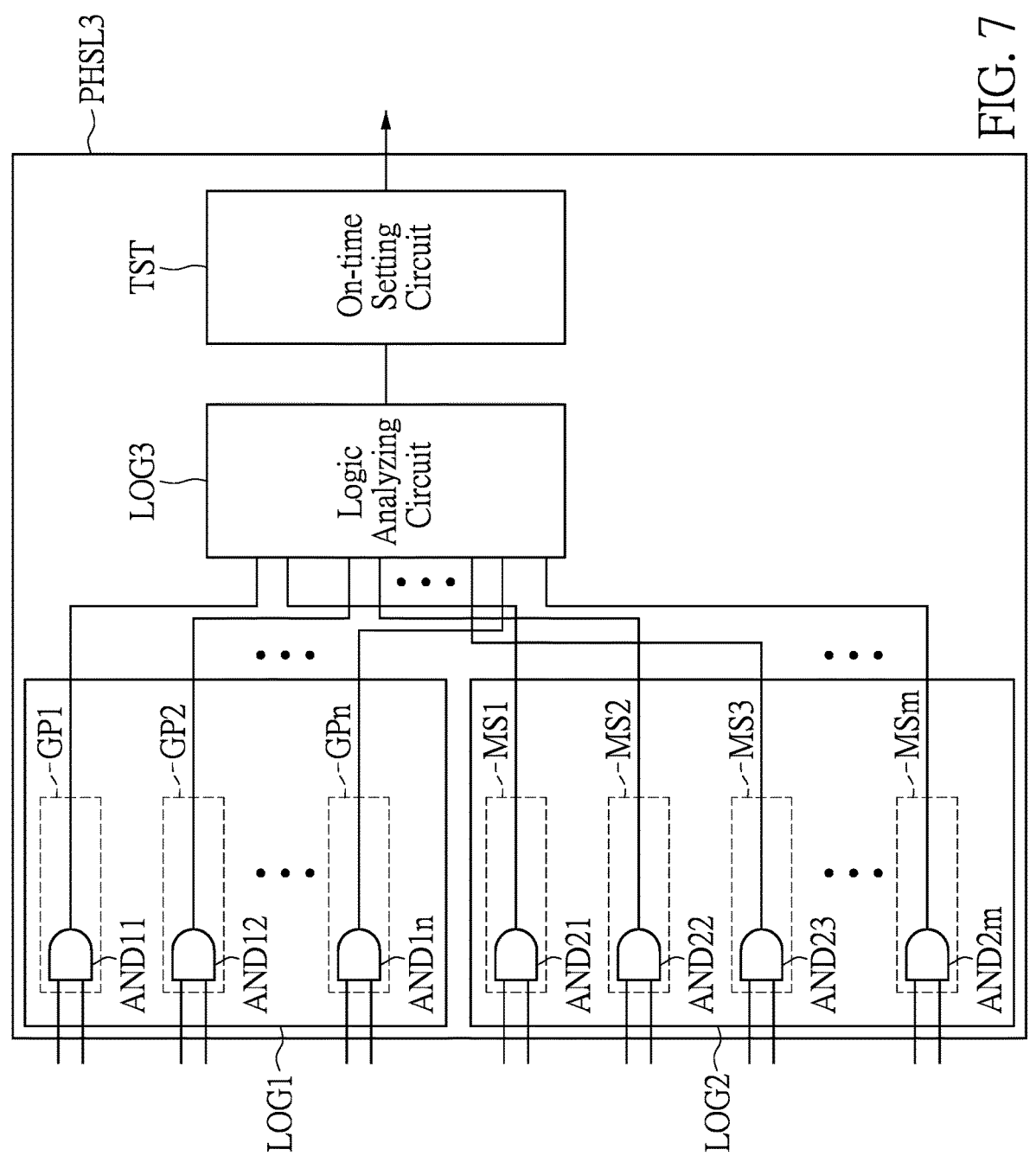
FIG. 7 is a block diagram of a phase selecting circuit of a power supply control system for a multi-phase power converter according to a sixth embodiment of the present disclosure.

Reference is made to FIG. 7, which is a block diagram of a phase selecting circuit of a power supply control system for a multi-phase power converter according to a sixth embodiment of the present disclosure.

The descriptions of the sixth embodiment of the present disclosure that are the same as the descriptions of the fourth embodiment of the present disclosure are not repeated herein.

The phase selecting circuit PHSL as shown in FIG. 1 may be replaced with a phase selecting circuit PHSL3 as shown in FIG. 7.

For example, as shown in FIG. 7, the plurality of grouping comparing circuits GP1 to GPn include a plurality of AND gates AND11 to AND1$n$ respectively.

A first input terminal and a second input terminal of each of the plurality of AND gates AND11 to AND1$n$ are connected to the lookup table module, respectively obtain the logic values of the grouping codes of the two of the plurality of power converters PW1 to PW6 from the same one of the plurality of power group messages stored in the lookup table module. An output terminal of each of the plurality of AND gates AND11 to AND1$n$ is connected to the input terminal of the logic analyzing circuit LOG3.

For example, as shown in FIG. 7, the plurality of master-slave reference comparing circuits MS1 to MSm include a plurality of AND gates AND21 to AND2$m$ respectively.

A first input terminal of each of the plurality of AND gates AND21 to AND2$m$ is connected to the lookup table module, obtains the logic value of the master-slave code of the master power converter that is one of the plurality of power converters PW1 to PW6 from the lookup table module. Second input terminals of the plurality of AND gates AND21 to AND2$m$ receive the plurality of comparing signals of the plurality of power converters PW1 to PW6 from the comparing circuit COMP respectively. An output terminal of each of the plurality of AND gates AND21 to AND2$m$ is connected to the input terminal of the logic analyzing circuit LOG3.

In practice, the plurality of AND gates AND21 to AND2$m$ of the sixth embodiment of the present disclosure may be replaced with the plurality of NAND gates NAND21 to NAND2$m$ and the plurality of NOT gates NOT21 to NOT2$m$ as shown in FIG. 6, or other logic components. Alternatively, the plurality of AND gates AND11 to AND1$n$ of the sixth embodiment of the present disclosure may be replaced with the plurality of NAND gates NAND11 to NAND In and the plurality of NOT gates NOT11 to NOT1$n$ as shown in FIG. 6, or other logic components.

Figure 8:
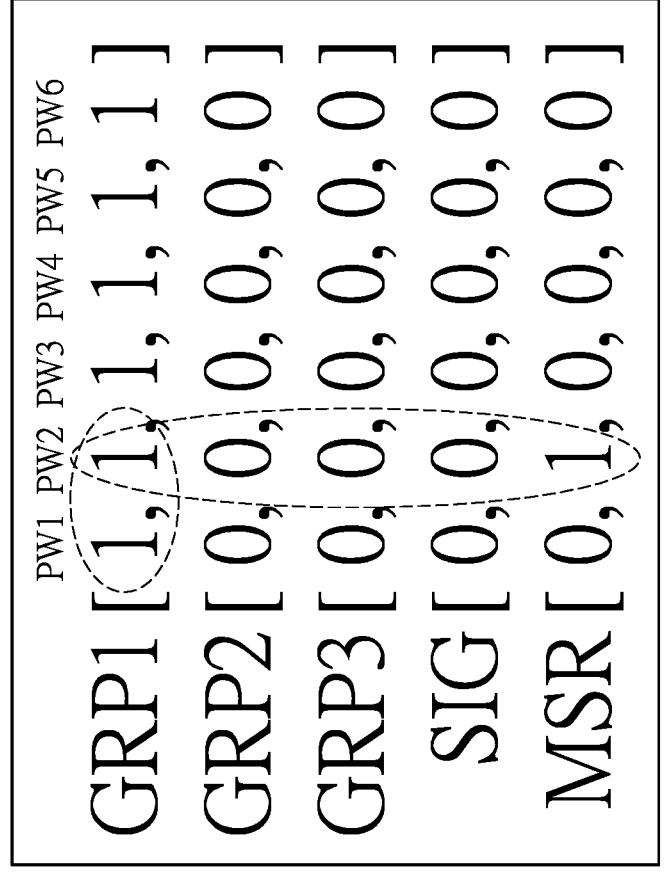
FIG. 8 is a schematic diagram of a plurality of grouping codes and a plurality of master-slave codes of a power supply control system for a multi-phase power converter according to a seventh embodiment of the present disclosure.

Reference is made to FIG. 8, which is a schematic diagram of a plurality of grouping codes and a plurality of master-slave codes of a power supply control system for a multi-phase power converter according to a seventh embodiment of the present disclosure.

The phase selecting circuit of the power supply control system of the present disclosure (such as the phase selecting circuit PHSL as shown in FIG. 1, the phase selecting circuit PHSL1 as shown in FIG. 5, the phase selecting circuit PHSL2 as shown in FIG. 6, the phase selecting circuit PHSL3 as shown in FIG. 7) may obtain the plurality of power group messages GRP1 to GRP3 and a plurality of master-slave messages MSR of the plurality of power converters PW1 to PW6 as shown in FIG. 1 from a lookup table as shown in FIG. 8. In practice, other messages of the plurality of power converters PW1 to PW6 may be also listed on the lookup table.

In the seventh embodiment, the phase selecting circuit of the power supply control system of the present disclosure obtains a plurality of grouping codes respectively of the plurality of power converters PW1 to PW6 from the power group message GRP1 of a first power group on the lookup table as shown in FIG. 8. In addition, the phase selecting circuit obtains a plurality of grouping codes respectively of the plurality of power converters PW1 to PW6 from the power group message GRP2 of a second power group on the lookup table as shown in FIG. 8. In addition, the phase selecting circuit obtains a plurality of grouping codes respectively of the plurality of power converters PW1 to PW6 from the power group message GRP3 of a third power group on the lookup table as shown in FIG. 8.

As shown in FIG. 8, in the seventh embodiment of the present disclosure, the plurality of grouping codes respectively of the plurality of power converters PW1 to PW6 in the power group message GRP1 of the first power group are equal to each other such as, but not limited to "1". It means that, all of the power converters PW1 to PW6 are classified in the first power group. Under this condition, all of the plurality of power converters PW1 to PW6 are connected to the same external electronic device and supply power to the same external electronic device.

As described above, the power supply control system of the present disclosure selects one of the plurality of power converters PW1 to PW6 that are classified in the same one of the plurality of power groups as the master power converter. The power supply control system of the present disclosure, according to the data (such as the comparing signal) of the master power converter, controls operations of others of the plurality of power converters PW1 to PW6 that are classified in the same one of the plurality of power groups with the master power converter.

In the seventh embodiment, the power supply control system of the present disclosure obtains the plurality of master-slave codes respectively of the plurality of power converters PW1 to PW6 from the master-slave message MSR on the lookup table as shown in FIG. 8. For example, the master-slave code of the power converter PW2 is "1" and the master-slave code of each of the power converters PW1 and PW3 to PW6 is "0", and accordingly the power supply control system of the present disclosure determines that the power converter PW2 is selected as the master power converter and the power converters PW1 and PW3 to PW6 are selected as the slave power converters.

Figure 9:
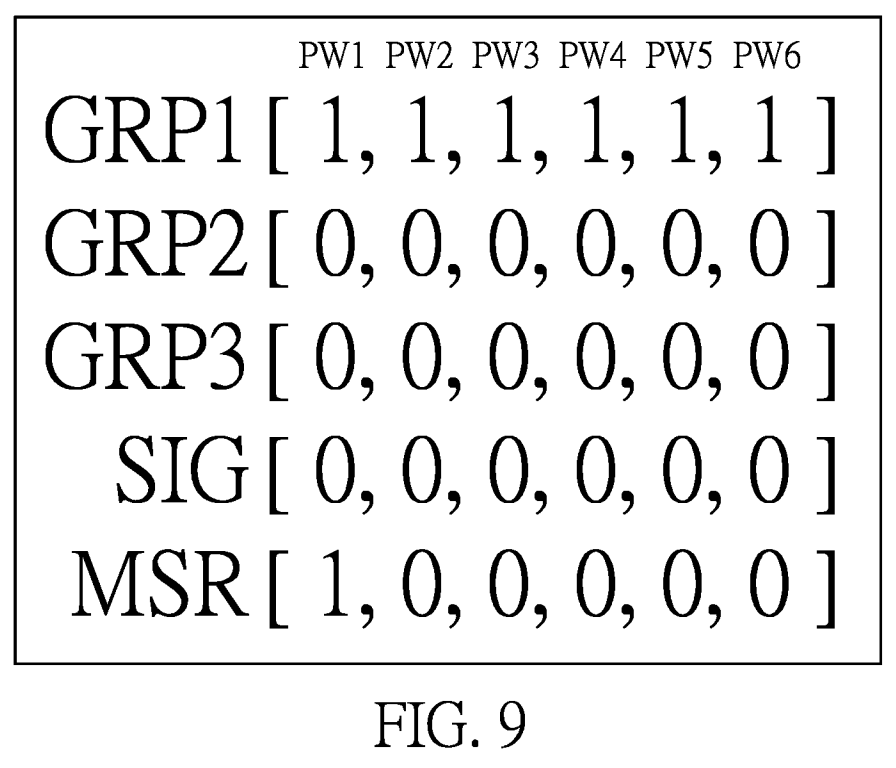
Figure 10:
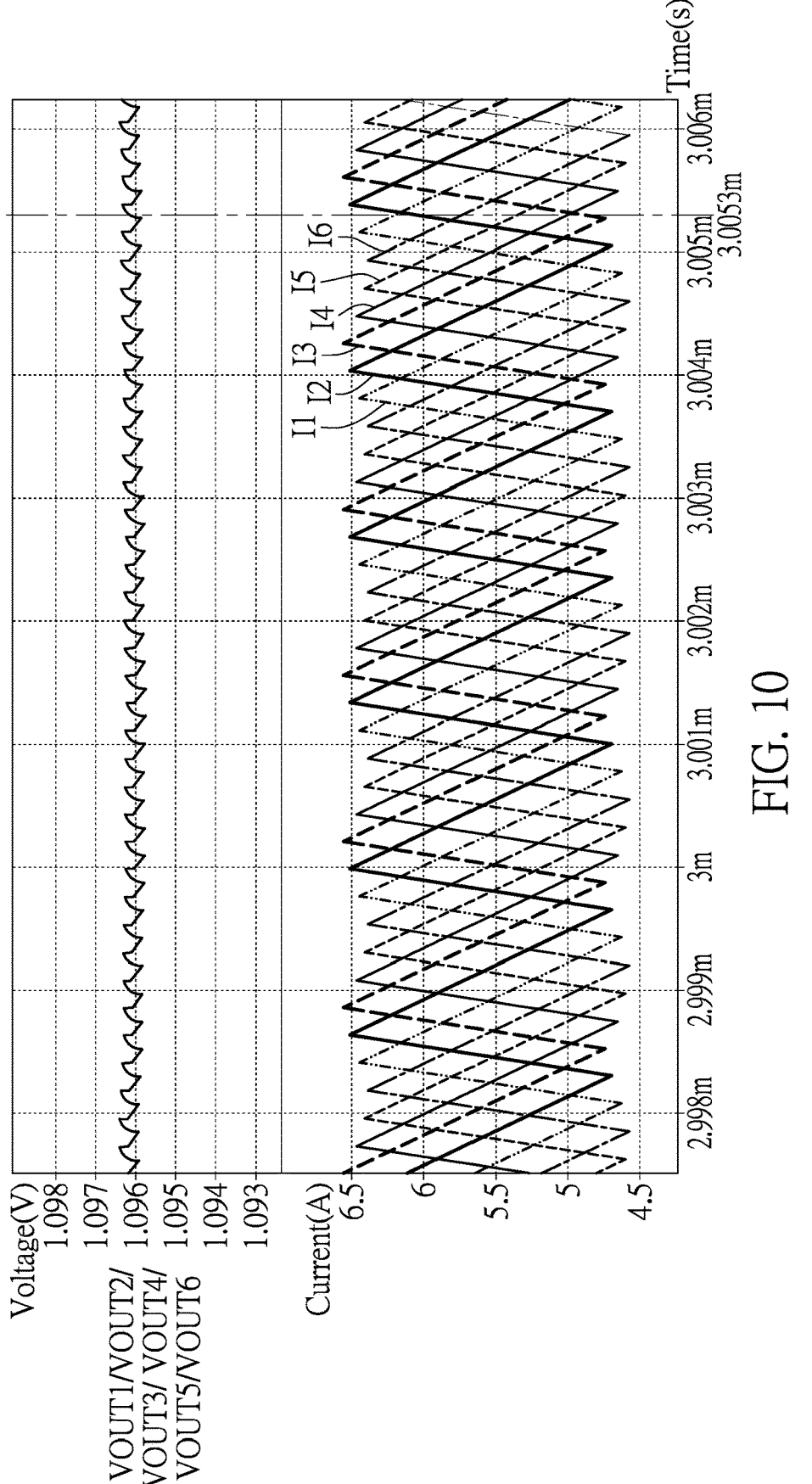
FIG. 10 is a waveform diagram of signals of the power supply control system for the multi-phase power converter according to the eighth embodiment of the present disclosure.

Reference is made to FIG. 9 and FIG. 10, in which FIG. 9 is a schematic diagram of a plurality of grouping codes and a plurality of master-slave codes of a power supply control system for a multi-phase power converter according to an eighth embodiment of the present disclosure, and FIG. 10 is a waveform diagram of signals of the power supply control system for the multi-phase power converter according to the eighth embodiment of the present disclosure.

The descriptions of the eighth embodiment of the present disclosure that are the same as the descriptions of the seventh embodiment of the present disclosure are not repeated herein.

Differences between the eighth and seventh embodiments of the present disclosure are described in detail as follows.

The phase selecting circuit of the power supply control system as described above may obtain the master-slave codes respectively of the power converters PW1 to PW6 from the master-slave message MSR on the lookup table as shown in FIG. 9. The master-slave code of the power converter PW1 is "1" and the master-slave code of each of the power converters PW2 to PW6 is "0". Accordingly, the power supply control system determines that the power converter PW1 is selected as the master power converter and the power converters PW2 to PW6 are selected as the slave power converters.

In the eighth embodiment, the power supply control system of the present disclosure controls the operations of the plurality of power converters PW1 to PW6, according to the data (including the comparing signal) of the power converter PW1 that is selected as the master power converter as indicated on the lookup table as shown in FIG. 9. As a result, as shown in FIG. 10, the output voltages VOUT1 to VOUT6 respectively of the plurality of power converters PW1 to PW6 are equal to each other, and the output currents I1 to I6 respectively of the plurality of power converters PW1 to PW6 are equal to each other.

Figure 12:
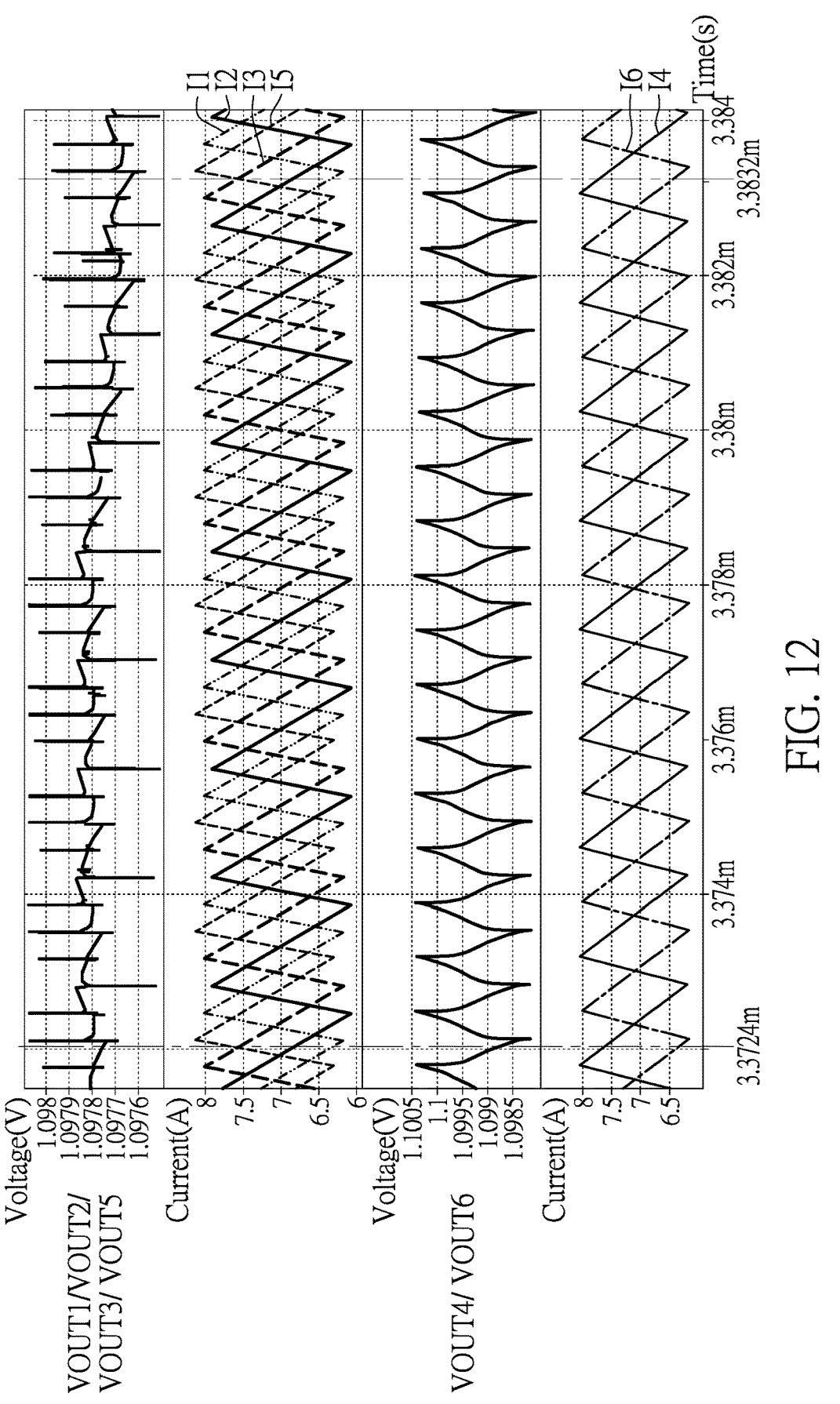
FIG. 12 is a waveform diagram of signals of the power supply control system for the multi-phase power converter according to the ninth embodiment of the present disclosure.

Reference is made to FIG. 11 and FIG. 12, in which FIG. 11 is a schematic diagram of a plurality of grouping codes and a plurality of master-slave codes of a power supply control system for a multi-phase power converter according to a ninth embodiment of the present disclosure, and FIG. 12 is a waveform diagram of signals of the power supply control system for the multi-phase power converter according to the ninth embodiment of the present disclosure.

The descriptions of the ninth embodiment of the present disclosure that are the same as the descriptions of the seventh embodiment of the present disclosure are not repeated herein.

Differences between the ninth and seventh embodiments of the present disclosure are described in detail as follows.

The phase selecting circuit of the power supply control system as described above may obtain the master-slave codes respectively of the power converters PW1 to PW6 from the master-slave message MSR on the lookup table as shown in FIG. 11. The grouping code of each of the power converters PW1, PW2, PW3, PW5 is "1" as shown in FIG. 11, and the phase selecting circuit accordingly determines that the power converters PW1, PW2, PW3, PW5 are classified in the first power group.

In the ninth embodiment, the phase selecting circuit of the power supply control system of the present disclosure obtains the master-slave codes of the power converters PW1, PW2, PW3, PW5 that are classified in the first power group from the master-slave message MSR on the lookup table as shown in FIG. 11. The master-slave code of the power converter PW1 is "1", the master-slave code of the power converter PW2 is "0", the master-slave code of the power converter PW3 is "0", and the master-slave code of the power converter PW5 is "0". Accordingly, the phase selecting circuit determines that the power converter PW1 is selected as the master power converter and the power converters PW2, PW3, PW5 are selected as the slave power converters in the first power group.

In the ninth embodiment, the power supply control system of the present disclosure controls the operations of the power converters PW1, PW2, PW3, PW5 according to the data (including the comparing signal) of the power converter PW1 that is selected as the master power converter as indicated on the lookup table as shown in FIG. 11. As a result, as shown in FIG. 12, the output voltages VOUT1, VOUT2, VOUT3, VOUT5 respectively of the plurality of power converters PW1, PW2, PW3, PW5 are equal to each other, and the output currents I1, I2, I3, I5 respectively of the plurality of power converters PW1, PW2, PW3, PW5 are equal to each other.

On the other hand, in the ninth embodiment, the phase selecting circuit of the power supply control system of the present disclosure obtains the grouping codes of the power converters PW1 to PW6 from the power group message GRP2 of the second power group on the lookup table as shown in FIG. 11. The grouping code of each of the power converters PW4, PW6 is "1". Accordingly, the phase selecting circuit determines that both of the power converters PW4, PW6 are classified in the second power group.

In the ninth embodiment, the phase selecting circuit of the power supply control system of the present disclosure obtains the master-slave codes of the power converters PW4, PW6 that are classified in the second power group from the master-slave message MSR on the lookup table as shown in FIG. 11. The master-slave code of the power converter PW4 is "1", and the master-slave code of the power converter PW6 is "0". Accordingly, the phase selecting circuit determines that the power converter PW4 is selected as the master power converter and the power converter PW6 is selected as the slave power converter.

In the ninth embodiment, the power supply control system of the present disclosure controls the operations of the power converters PW4, PW6 according to the data (including the comparing signal) of the power converter PW4 that is selected as the master power converter as indicated on the lookup table as shown in FIG. 11. As a result, as shown in FIG. 12, the output voltages VOUT4, VOUT6 respectively of the power converters PW4, PW6 are equal to each other, and the output currents I4, I6 respectively of the power converters PW4, PW6 are equal to each other.

Figure 14:
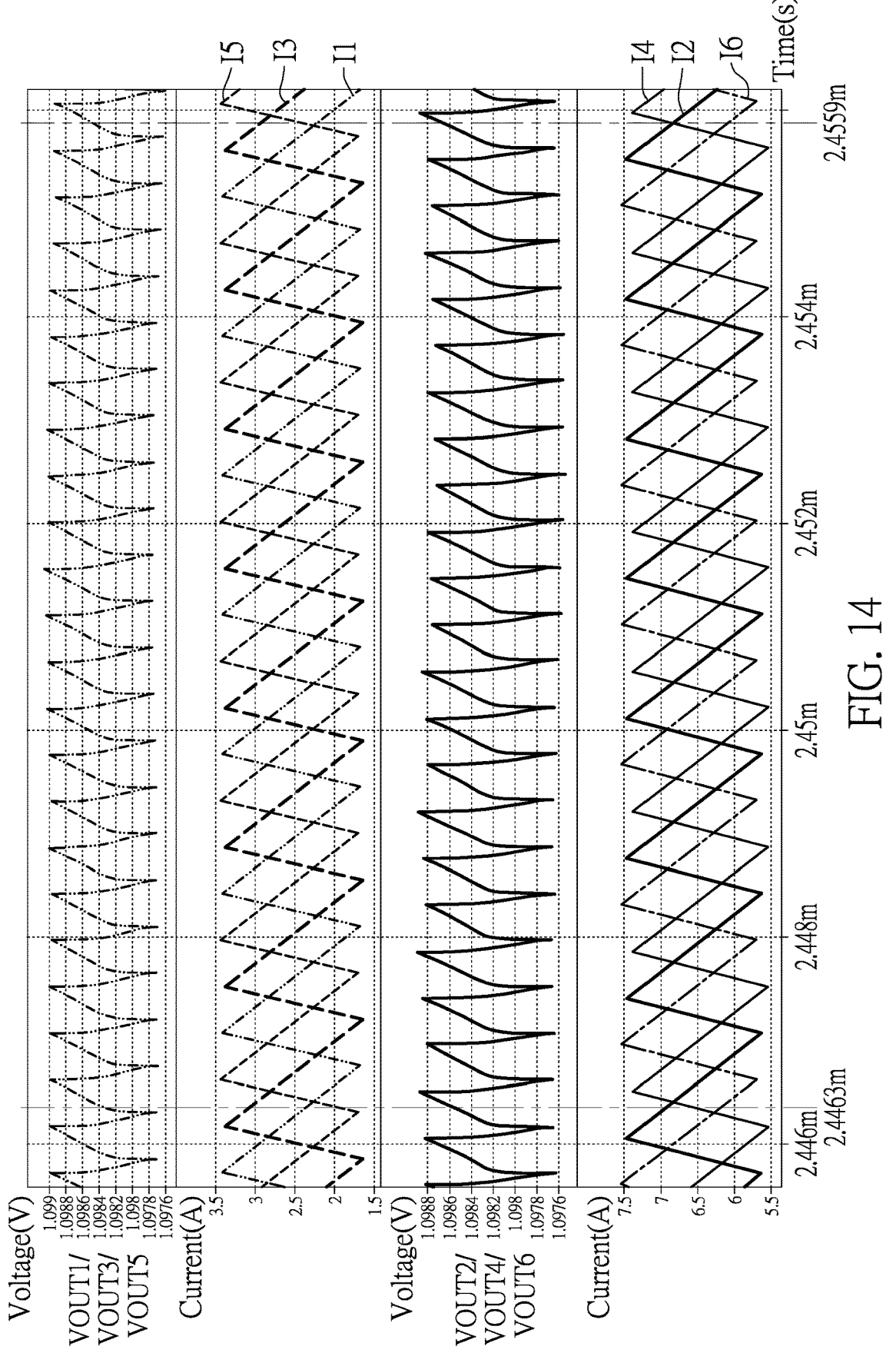
FIG. 14 is a waveform diagram of signals of the power supply control system for the multi-phase power converter according to the tenth embodiment of the present disclosure.

Reference is made to FIG. 13 and FIG. 14, in which FIG. 13 is a schematic diagram of a plurality of grouping codes and a plurality of master-slave codes of a power supply control system for a multi-phase power converter according to a tenth embodiment of the present disclosure, and FIG. 14 is a waveform diagram of signals of the power supply control system for the multi-phase power converter according to the tenth embodiment of the present disclosure.

The descriptions of the tenth embodiment of the present disclosure that are the same as the descriptions of the seventh embodiment of the present disclosure are not repeated herein.

Differences between the tenth and seventh embodiments of the present disclosure are described in detail as follows.

The phase selecting circuit of the power supply control system as described above may obtain the plurality of grouping codes of the power converters PW1 to PW6 from the power group message GRP1 of the first power group on the lookup table as shown in FIG. 13. The grouping code of each of the power converters PW1, PW3, PW5 is "1". Accordingly, the phase selecting circuit determines that the power converters PW1, PW3, PW5 are classified in the first power group.

In the tenth embodiment, the phase selecting circuit of the power supply control system of the present disclosure obtains the master-slave codes of the power converters PW1, PW3, PW5 that are classified in the first power group from the master-slave message MSR on the lookup table as shown in FIG. 13. The master-slave code of the power converter PW1 is "1", the master-slave code of the power converter PW3 is "0", and the master-slave code of the power converter PW5 is "0". Accordingly, the phase selecting circuit determines that the power converter PW1 is selected as the master power converter and the power converters PW3, PW5 are selected as the slave power converters.

In the tenth embodiment, the power supply control system of the present disclosure controls the operations of the power converters PW1, PW3, PW5 according to the data (including the comparing signal) of the power converter PW1 that is selected as the master power converter as indicated on the lookup table as shown in FIG. 13. As a result, as shown in FIG. 14, the output voltages VOUT1, VOUT3, VOUT5 of the power converters PW1, PW3, PW5 are equal to each other, and the output currents I1, I3, I5 of the power converters PW1, PW3, PW5 are equal to each other.

On the other hand, in the tenth embodiment, the phase selecting circuit of the power supply control system of the present disclosure obtains the grouping codes of the power converters PW1 to PW6 from the power group message GRP2 of the second power group on the lookup table as shown in FIG. 13. The grouping code of each of the power converters PW2, PW4, PW6 is "1". Accordingly, the phase selecting circuit determines that the power converters PW2, PW4, PW6 are classified in the second power group.

In the tenth embodiment, the phase selecting circuit of the power supply control system of the present disclosure obtains the master-slave codes of the power converters PW2, PW4, PW6 that are classified in the second power group from the master-slave message MSR on the lookup table as shown in FIG. 13. The master-slave code of the power converter PW2 is "1", the master-slave code of the power converter PW4 is "0" and the master-slave code of the power converter PW6 is "0". Accordingly, the phase selecting circuit determines that the power converter PW2 is selected as the master power converter and the power converters PW4, PW6 are selected as the slave power converters.

In the tenth embodiment, the power supply control system of the present disclosure controls the operation of the power converters PW2, PW4, PW6 according to the data (including the comparing signal) of the power converter PW2 that is selected as the master power converter as indicated on the lookup table as shown in FIG. 13. As a result, as shown in FIG. 14, the output voltages VOUT2, VOUT4, VOUT6 respectively of the power converters PW2, PW4, PW6 are equal to each other, and the output currents I2, I4, I6 respectively of the power converters PW2, PW4, PW6 are equal to each other.

Figure 15:
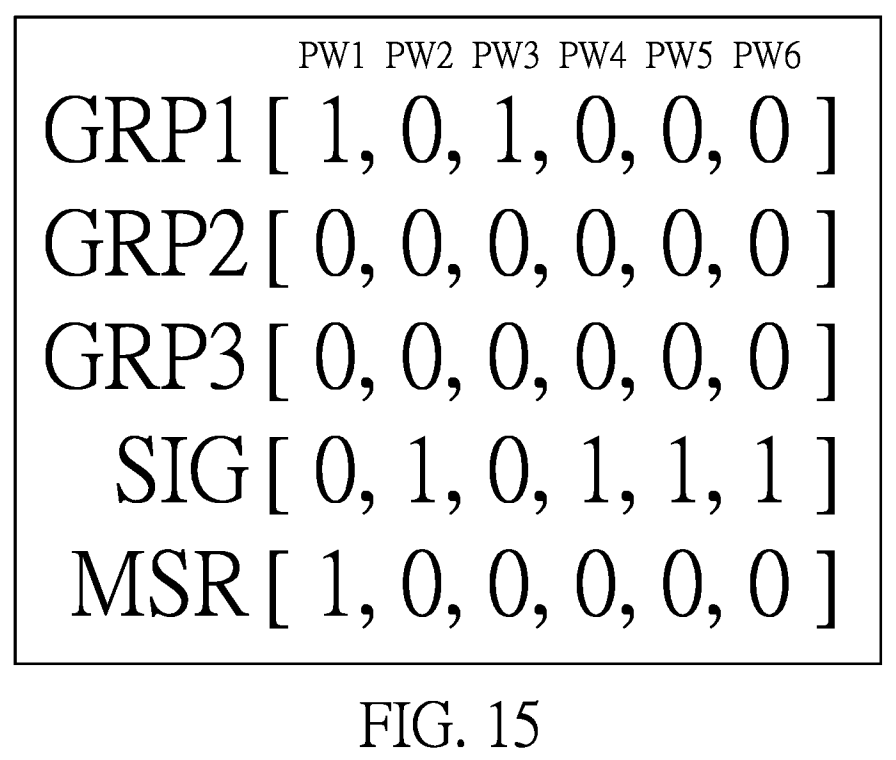
Figure 16:
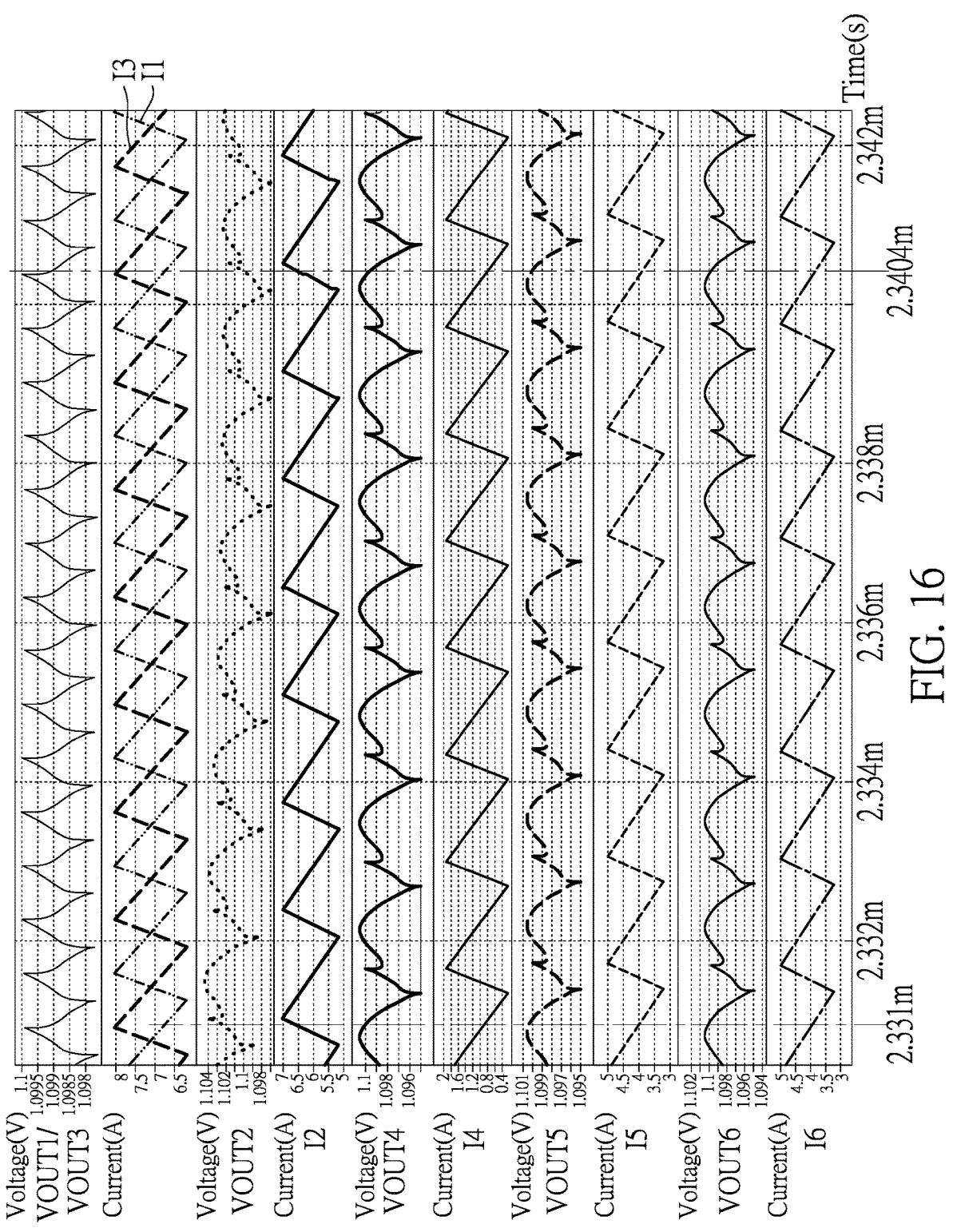
FIG. 16 is a waveform diagram of signals of the power supply control system for the multi-phase power converter according to the eleventh embodiment of the present disclosure.

Reference is made to FIG. 15 and FIG. 16, in which FIG. 15 is a schematic diagram of a plurality of grouping codes and a plurality of master-slave codes of a power supply control system for a multi-phase power converter according to an eleventh embodiment of the present disclosure, and FIG. 16 is a waveform diagram of signals of the power supply control system for the multi-phase power converter according to the eleventh embodiment of the present disclosure.

The descriptions of the eleventh embodiment of the present disclosure that are the same as the descriptions of the seventh embodiment of the present disclosure are not repeated herein.

Differences between the eleventh and seventh embodiments of the present disclosure are described in detail as follows.

The phase selecting circuit of the power supply control system as described above may obtain the plurality of grouping codes of the power converters PW1 to PW6 from the power group message GRP1 of the first power group on the lookup table as shown in FIG. 15. The grouping code of each of the power converters PW1, PW3 is "1". Accordingly, the phase selecting circuit determines that the power converters PW1, PW3 are classified in the first power group.

In the eleventh embodiment, the phase selecting circuit of the power supply control system of the present disclosure obtains the master-slave codes of the power converters PW1, PW3 that are classified in the first power group from the master-slave message MSR on the lookup table as shown in FIG. 15. The master-slave code of the power converter PW1 is "1", and the master-slave code of the power converter PW3 is "0". Accordingly, the phase selecting circuit determines that the power converter PW1 is selected as the master power converter and the power converter PW3 is selected as the slave power converter.

In the eleventh embodiment, the power supply control system of the present disclosure controls the operations of the power converters PW1, PW3 according to the data (including the comparing signal) of the power converter PW1 that is selected as the master power converter as indicated on the lookup table as shown in FIG. 15. As a result, as shown in FIG. 16, the output voltages VOUT1, VOUT3 respectively of the power converters PW1, PW3 are equal to each other, and the output currents I1, I3 respectively of the power converters PW1, PW3 are equal to each other.

On the other hand, in the eleventh embodiment, the phase selecting circuit of the power supply control system of the present disclosure obtains a plurality of individual control codes of the power converters PW1 to PW6 from an individual power supply control message SIG on the lookup table as shown in FIG. 15. Each of the plurality of individual control codes of the power converters PW2, PW4, PW5, PW6 is "1". Accordingly, the phase selecting circuit individually controls each of the power converters PW2, PW4, PW5, PW6. The power converters PW2, PW4, PW5, PW6 may supply power to different ones of a plurality of external electronic devices respectively.

As a result, as shown in FIG. 16, the output voltages VOUT2, VOUT4, VOUT5, VOUT6 respectively of the power converters PW2, PW4, PW5, PW6 may not be equal to each other and may not be equal to the output voltage VOUT1 of the power converter PW1. The output currents I2, I4, I5, I6 respectively of the power converters PW2, PW4, PW5, PW6 may not be equal to each other and may not be equal to the output current I1 of the power converter PW1.

Figure 17:
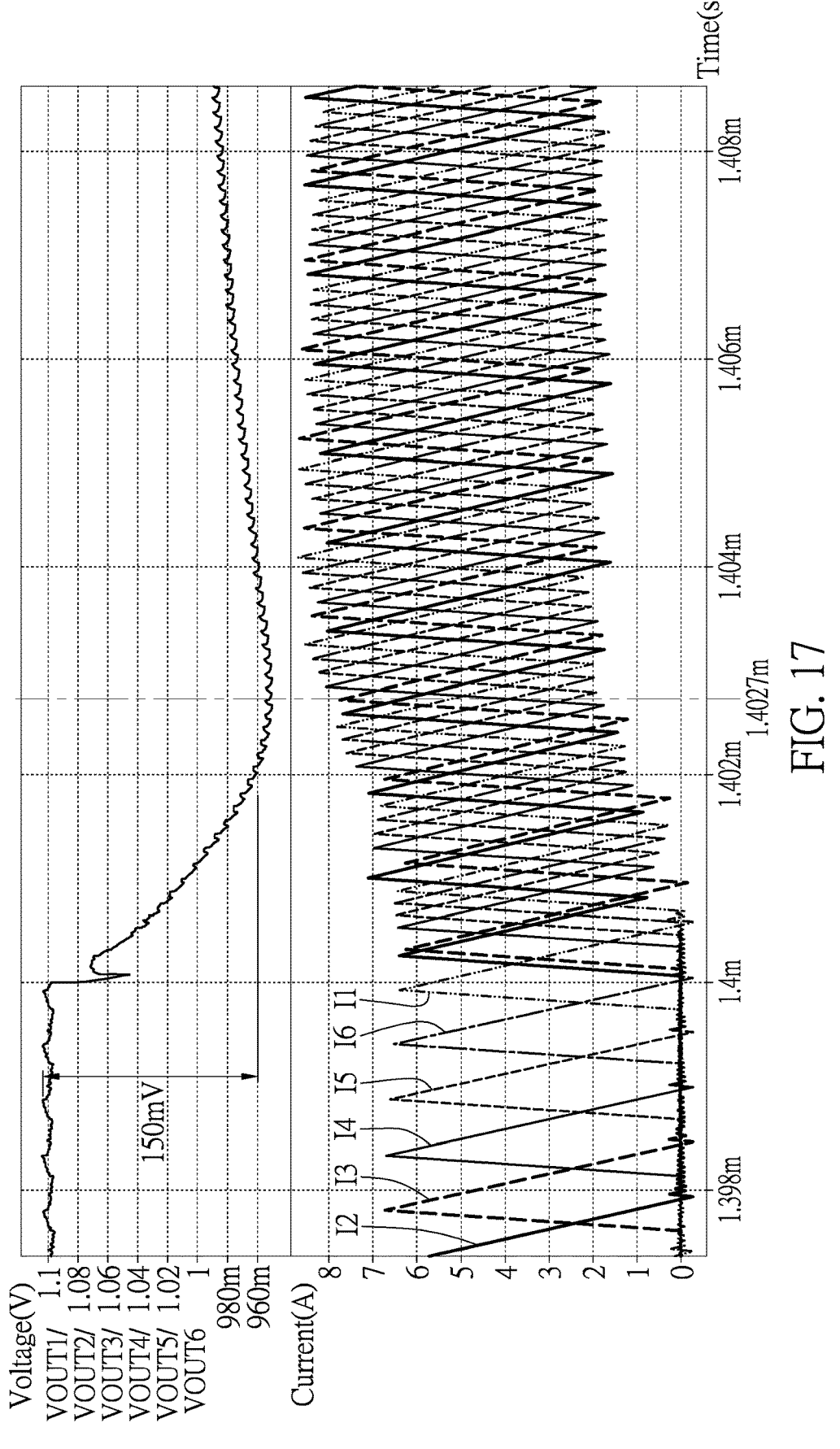
FIG. 17 is a waveform diagram of signals of the power supply control system for the multi-phase power converter according to a twelfth embodiment of the present disclosure.

Reference is made to FIG. 17, which is a waveform diagram of signals of the power supply control system for the multi-phase power converter according to a twelfth embodiment of the present disclosure.

For example, an input voltage of each of the plurality of power converters PW1 to PW6 as shown in FIG. 1 is 5V. The phase selecting circuit of the power supply control system as described above controls the output voltages VOUT1 to VOUT6 respectively of the plurality of power converters PW1 to PW6 (supplying power to the same external electronic device) to gradually change to be equal to each other, and controls the output current I1 to I6 respectively of the plurality of power converters PW1 to PW6 to gradually change to be equal to each other as shown in FIG. 17.

Figure 18:
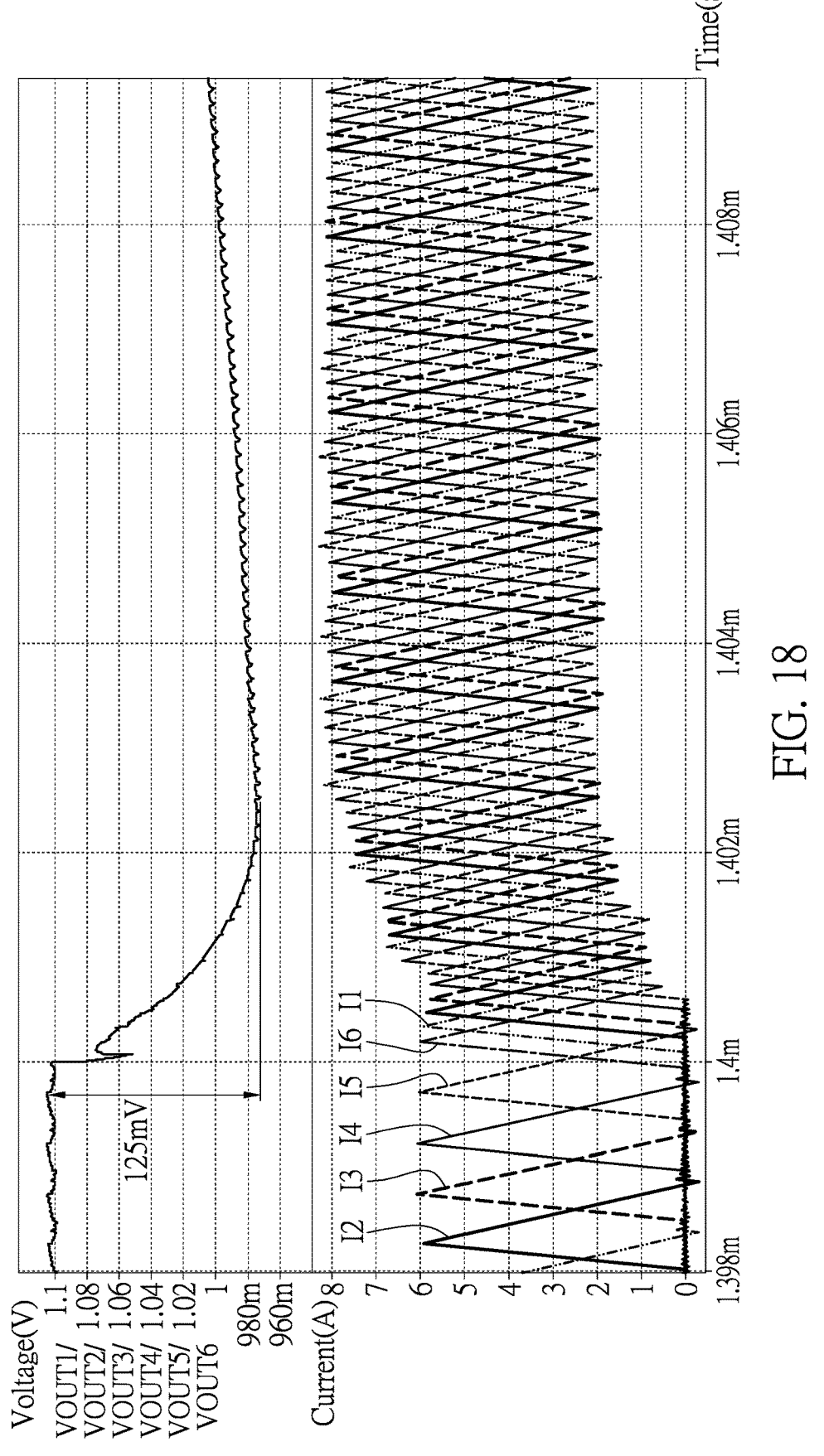
FIG. 18 is a waveform diagram of signals of the power supply control system for the multi-phase power converter according to a thirteenth embodiment of the present disclosure.

Reference is made to FIG. 18, which is a waveform diagram of signals of the power supply control system for the multi-phase power converter according to a thirteenth embodiment of the present disclosure.

For example, in the thirteenth embodiment of the present disclosure, an input voltage of each of the plurality of power converters PW1 to PW6 as shown in FIG. 1 or FIG. 3 is 3.8V. Under this condition, the power supply control system as shown in FIG. 1 or FIG. 3 controls the output voltages VOUT1 to VOUT6 of the plurality of power converters PW1 to PW6 (supplying power to the same external electronic device) to more quickly change to be equal to each other, and controls the output current I1 to I6 of the plurality of power converters PW1 to PW6 to more quickly change to be equal to each other as shown in FIG. 18.

In conclusion, the present disclosure provides the power supply control system for the multi-phase power converter. The power supply control system of the present disclosure classifies the plurality of power converters into the plurality of power groups, and individually controls each of the plurality of power groups to supply power. This power supply control performed on different ones of the plurality of power groups by the power supply control system of the present disclosure do not interfere with each other. The power supply control system of the present disclosure selects one of the plurality of power converters classified in each of the plurality of power groups as the master power converter, and selects others of the plurality of power converters classified in each of the plurality of power groups as the slave power converters. The power supply control system of the present disclosure, according to data of the master power converter of each of the plurality of power groups, controls the operations of the master power converter and the slave power converters of each of the plurality of power groups. As a result, the power converters classified in the same one of the plurality of power groups respectively supply the output voltages being equal to each other, and respectively supply the outputs currents being equal to each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power supply control system for a multi-phase power converter, wherein the multi-phase power converter includes a plurality of power converters, the power supply control system comprising:

an error amplifying circuit connected to the plurality of power converters, and configured to multiply a difference between an output voltage of each of the plurality of power converters and a first reference voltage by a gain to output an error amplified signal;

a comparing circuit connected to the error amplifying circuit, and configured to compare a voltage of the error amplified signal of each of the plurality of power converters with a ramp signal to output a comparing signal;

a phase selecting circuit connected to the comparing circuit, wherein the phase selecting circuit classifies each of the plurality of power converters into one of a plurality of power groups, the phase selecting circuit selects one of the plurality of power converters classified in each of the plurality of power groups as a master power converter and selects others of the plurality of power converters classified in each of the plurality of power groups as a plurality of slave power converters, and the phase selecting circuit outputs the comparing signal of the master power converter as a master phase signal and outputs the comparing signal of each of the plurality of slave power converters as a slave phase signal;

a multi-phase controlling circuit connected to the phase selecting circuit, and configured to output an on-time controlling signal according to the master phase signal of the master power converter from the phase selecting circuit; and an on-time determining circuit connected to the multi-phase controlling circuit and each of the plurality of power converters, wherein the on-time determining circuit, according to the on-time controlling signal of the master power converter classified in each of the plurality of power groups, sets an on-time to output an on-time signal respectively to the power converters classified in each of the plurality of power groups for controlling an operation of the power converters.

2. The power supply control system according to claim 1, wherein each of the plurality of power converters includes:

a high-side switch, wherein a first terminal of the high-side switch is coupled to an input voltage;

a low-side switch, wherein a first terminal of the low-side switch is connected to a second terminal of the high-side switch, a node between the first terminal of the low-side switch and the second terminal of the high-side switch is connected to a first terminal of an inductor, a second terminal of the inductor is connected to a first terminal of a capacitor, and a second terminal of the capacitor is grounded;

a driver circuit connected to a control terminal of the high-side switch and a control terminal of the low-side switch; and a control circuit connected to the driver circuit and an output terminal of the on-time determining circuit, and configured to control the driver circuit to drive the high-side switch and the low-side switch according to the on-time signal from the on-time determining circuit.

3. The power supply control system according to claim 1, wherein the multi-phase controlling circuit obtains a plurality of master-slave codes respectively of the plurality of power converters from a lookup table, determines which one of the plurality of power converters to select according to the plurality of master-slave codes, and uses the comparing signal of the power converter that is selected as the master phase signal.

4. The power supply control system according to claim 3, wherein the master-slave code of one of the plurality of power converters is equal to a first master-slave code and the multi-phase controlling circuit uses the comparing signal of the one of the plurality of power converter as the master phase signal, and the master-slave code of every other one of the plurality of power converters is equal to a second master-slave code and the multi-phase controlling circuit uses the comparing signal of every other one of the plurality of power converters as the slave phase signal.

5. The power supply control system according to claim 1, wherein the multi-phase controlling circuit obtains a plurality of grouping codes respectively of the plurality of power converters that are classified in the plurality of power groups from a lookup table, and the multi-phase controlling circuit determines which ones of the plurality of power converters are classified in a same one of the plurality of power groups according to the plurality of grouping codes respectively of the plurality of power converters.

6. The power supply control system according to claim 1, wherein the error amplifying circuit includes a plurality of error amplifiers, first input terminals of the plurality of error amplifiers are connected to output terminals of the plurality of power converters respectively, a second input terminal of each of the plurality of error amplifiers is coupled to the first reference voltage, and an output terminal of each of the plurality of error amplifiers is connected to an input terminal of the comparing circuit.

7. The power supply control system according to claim 6, wherein the comparing circuit includes a plurality of comparators, first input terminals of the plurality of comparators are connected to the output terminals of the plurality of error amplifiers, respectively, a second input terminal of each of the plurality of comparators is connected to an external ramp signal generator and receives the ramp signal from the external ramp signal generator, and an output terminal of each of the plurality of comparators is connected to an input terminal of the phase selecting circuit.

8. The power supply control system according to claim 7, wherein the phase selecting circuit includes a plurality of phase selectors, input terminals of the plurality of phase selectors are connected to the output terminals of the plurality of comparators, respectively, and an output terminal of each of the plurality of phase selectors is connected to an input terminal of the multi-phase controlling circuit;

wherein one of the plurality of phase selectors uses the comparing signal from one of the plurality of comparators as the master phase signal and outputs the master phase signal according to a master-slave instructing signal, and every other one of the plurality of phase selectors uses the comparing signal from another one of the plurality of comparators as the slave phase signal and outputs the slave phase signal according to the master-slave instructing signal.

9. The power supply control system according to claim 8, wherein the on-time determining circuit includes a plurality of on-time generators, an input terminal of each of the plurality of on-time generators is connected to an output terminal of the multi-phase controlling circuit, and output terminals of the plurality of on-time generators are connected to input terminals of the plurality of power converters, respectively.

10. The power supply control system according to claim 1, wherein the phase selecting circuit includes a plurality of master-slave reference comparing circuits, a logic analyzing circuit and an on-time setting circuit, an input terminal of each of the plurality of master-slave reference comparing circuits is connected to an output terminal of the comparing circuit, the logic analyzing circuit is connected to an output terminal of each of the plurality of master-slave reference comparing circuits and an input terminal of the on-time setting circuit, and an output terminal of the on-time setting circuit is used as an output terminal of the phase selecting circuit;

wherein the plurality of master-slave reference comparing circuits receives the plurality of comparing signals from the plurality of power converters, respectively, the plurality of master-slave reference comparing circuits compare levels of the comparing signals with a master-slave code of the master power converter to output a plurality of master control reference comparing signals, respectively, and the logic analyzing circuit controls the on-time setting circuit to output the on-time signal to each of the plurality of power converters according to the plurality of master control reference comparing signals from the plurality of master-slave reference comparing circuits.

11. The power supply control system according to claim 10, wherein each of the plurality of master-slave reference comparing circuits includes an AND gate, a first input terminal of the AND gate of each of the plurality of master-slave reference comparing circuits is connected to a lookup table module and obtains a logic value of the master-slave code of the master power converter from the lookup table module, second input terminals of the plurality of master-slave reference comparing circuits receive the comparing signals of the plurality of power converters from the comparing circuit, respectively, and an output terminal of the AND gate of each of the plurality of master-slave reference comparing circuits is connected to an input terminal of the logic analyzing circuit.

12. The power supply control system according to claim 10, wherein each of the plurality of master-slave reference comparing circuits includes a NAND gate and a NOT gate, a first input terminal of the NAND gate of each of the plurality of master-slave reference comparing circuits is connected to a lookup table module and obtains a logic value of the master-slave code of the master power converter from the lookup table module, second input terminals of the NAND gates of the plurality of master-slave reference comparing circuits receive the comparing signals of the plurality of power converters from the comparing circuit, respectively, an output terminal of the NAND gate is connected to an input terminal of the NOT gate in each of the plurality of master-slave reference comparing circuits, and an output terminal of the NOT gate of each of the plurality of master-slave reference comparing circuits is connected to an input terminal of the logic analyzing circuit.

13. The power supply control system according to claim 10, wherein the phase selecting circuit further includes a plurality of grouping comparing circuits, the plurality of grouping comparing circuits are connected to the logic analyzing circuit, and the plurality of power converters are classified in the plurality of power groups;

wherein the plurality of grouping comparing circuits are connected to a lookup table module and obtain a plurality of grouping codes respectively of the plurality of power converters from a plurality of power group messages stored in the lookup table module, and each of the plurality of grouping comparing circuits compares the grouping codes of two of the plurality of power converters with each other to output a grouping comparing signal;

wherein the logic analyzing circuit determines whether the two of the plurality of power converters are classified in a same one of the plurality of power groups according to the grouping comparing signal from each of the plurality of grouping comparing circuits, and accordingly controls the on-time setting circuit to output the on-time signal to each of the plurality of power converters.

14. The power supply control system according to claim 13, wherein each of the plurality of grouping comparing circuits includes an AND gate, a first input terminal and a second input terminal of the AND gate of each of the plurality of grouping comparing circuits respectively receive logic values of the grouping codes of the two of the plurality of power converters from each of the plurality of power group messages stored in a lookup table module, and an output terminal of the AND gate of each of the plurality of grouping comparing circuits is connected to an input terminal of the logic analyzing circuit.

15. The power supply control system according to claim 13, wherein each of the plurality of grouping comparing circuits includes a NAND gate and an NOT gate, a first input terminal and a second input terminal of the NAND gate of each of the plurality of grouping comparing circuits respectively receive logic values of the grouping codes of two of the plurality of power converters from each of the plurality of power group messages stored in a lookup table module, an output terminal of the NAND gate is connected to an input terminals of the NOT gate in each of the plurality of grouping comparing circuits, and an output terminal of the NOT gate of each of the plurality of grouping comparing circuits is connected to an input terminal of the logic analyzing circuit.

* * * * *